(12) United States Patent
Kanno et al.

(10) Patent No.: US 6,927,877 B2
(45) Date of Patent: Aug. 9, 2005

(54) IMAGE PROCESSING METHOD AND APPARATUS FOR CONVERTING COLORS IN A COLOR IMAGE

(75) Inventors: Akiko Kanno, Yokohama (JP); Takashi Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 10/119,757

(22) Filed: Apr. 11, 2002

(65) Prior Publication Data

US 2002/0145745 A1 Oct. 10, 2002

Related U.S. Application Data

(62) Division of application No. 08/353,906, filed on Dec. 12, 1994, now Pat. No. 6,434,266.

(30) Foreign Application Priority Data

| Dec. 17, 1993 | (JP) | ............................................. 5-318739 |
| Dec. 28, 1993 | (JP) | ............................................. 5-337599 |
| Mar. 25, 1994 | (JP) | ............................................. 6-55729 |
| Mar. 31, 1994 | (JP) | ............................................. 6-62963 |

(51) Int. Cl.[7] ............................ H04N 1/46; G06K 9/00
(52) U.S. Cl. ...................... 358/3.1; 382/167; 382/264; 382/162; 358/520; 358/1.2; 358/3.2
(58) Field of Search ................................ 358/500, 501, 358/515, 518, 519, 520, 1.2, 3.07, 3.08, 3.1, 3.2, 536; 382/162, 167, 264

(56) References Cited

U.S. PATENT DOCUMENTS

| 4,745,443 A | 5/1988 | Adachi et al. ................. 355/40 |
| 4,782,384 A * | 11/1988 | Tucker et al. ................ 348/577 |
| 4,873,570 A | 10/1989 | Suzuki et al. ................. 358/80 |
| 4,958,217 A | 9/1990 | Kimura et al. ............... 358/538 |
| 5,105,266 A | 4/1992 | Telle ............................ 358/80 |
| 5,140,413 A | 8/1992 | Suzuki et al. .................. 358/80 |
| 5,194,945 A | 3/1993 | Kadowaki et al. ............. 358/75 |
| 5,260,804 A | 11/1993 | Fukutomi .................... 358/444 |
| 5,317,678 A | 5/1994 | Okawara et al. ............. 395/126 |
| 5,341,226 A * | 8/1994 | Shiau .......................... 358/518 |
| 5,517,334 A * | 5/1996 | Morag et al. ................ 358/518 |
| 5,537,516 A * | 7/1996 | Sherman et al. ............. 358/1.9 |
| 5,574,498 A * | 11/1996 | Sakamoto et al. ........... 348/169 |
| 5,615,320 A | 3/1997 | Lavendel .................... 395/131 |
| 5,644,509 A * | 7/1997 | Schwartz .................... 358/518 |
| 5,666,139 A * | 9/1997 | Thielens et al. ............. 345/173 |
| 5,726,779 A | 3/1998 | Kadowaki .................... 358/520 |
| 5,909,220 A | 6/1999 | Sandow ...................... 358/518 |
| 6,031,543 A | 2/2000 | Miyashita et al. ........... 382/167 |
| 6,108,441 A | 8/2000 | Hiratsuka et al. ........... 382/167 |
| 6,172,763 B1 * | 1/2001 | Toyoda et al. .............. 358/1.15 |
| 6,408,330 B1 * | 6/2002 | DeLaHuerga ............... 709/217 |
| 6,738,491 B1 * | 5/2004 | Ikenoue et al. ............. 382/100 |

FOREIGN PATENT DOCUMENTS

JP       04172617      *  1/1994    ........... G06F/15/62

OTHER PUBLICATIONS

Russ, John, "Image Processing Handbook", 1994, p. 40.

* cited by examiner

*Primary Examiner*—Jerome Grant, II
(74) *Attorney, Agent, or Firm*—Fitzpatrick, Cella, Harper & Scinto

(57) ABSTRACT

A color image signal is generated and an arbitrary color in the color image signal is set as a color to be converted. A color after conversion is designated. The color to be converted or a color similar to the color to be converted is converted into the color after conversion or a color similar to the color after conversion. By this processing, a color-converted image, in which a conversion boundary is unnoticeable, can be produced.

5 Claims, 25 Drawing Sheets

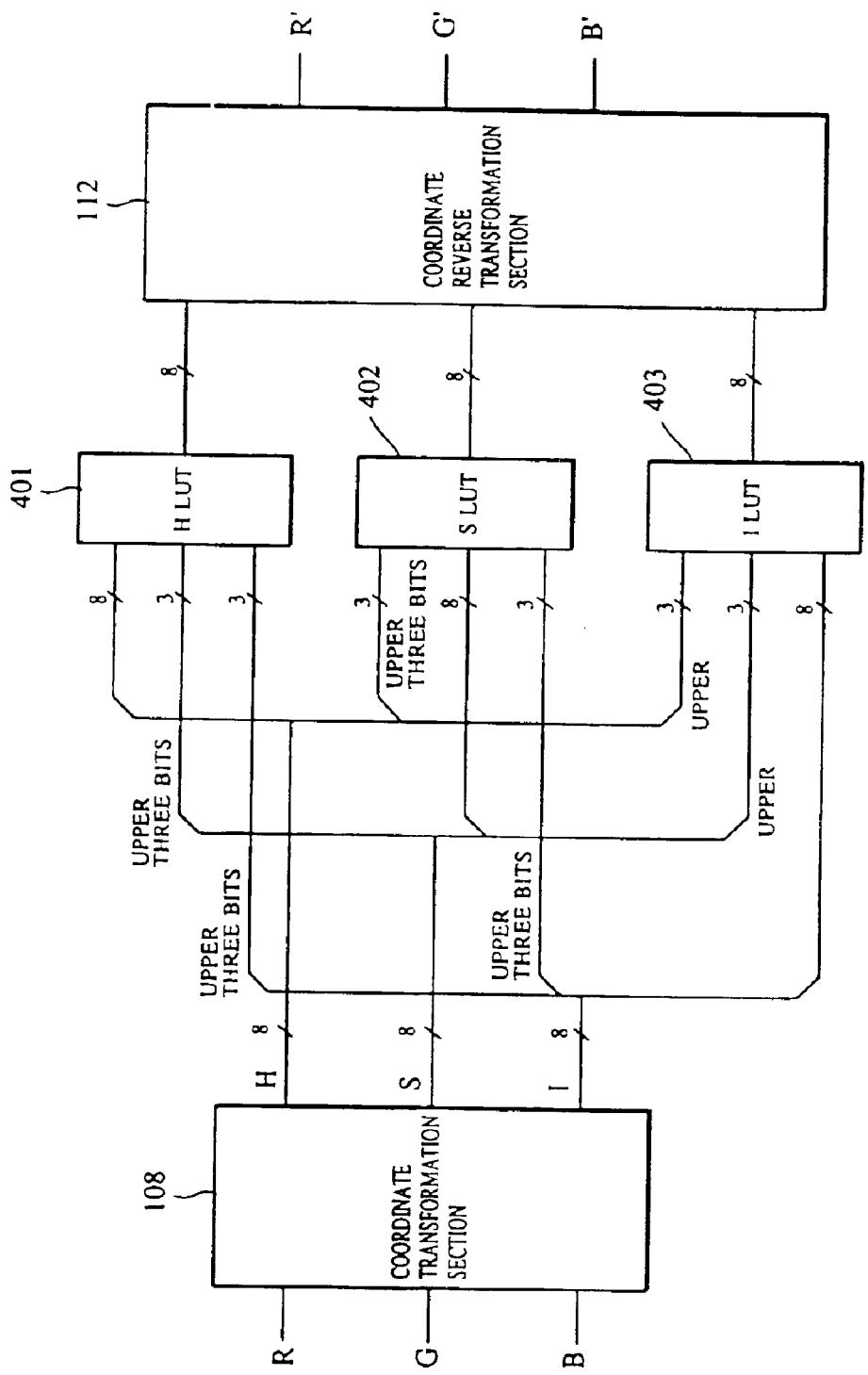

(S=CONSTANT)

FIG. 13
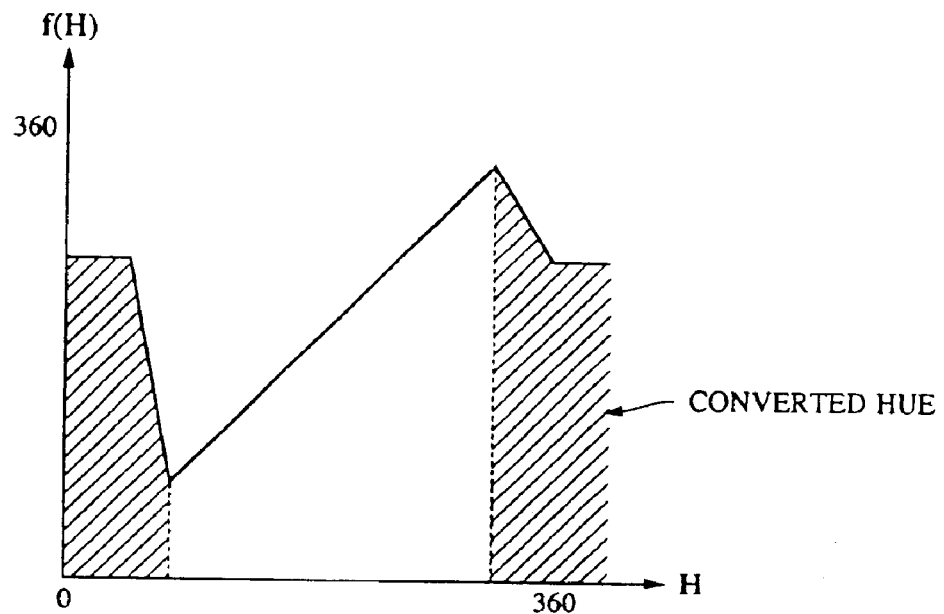
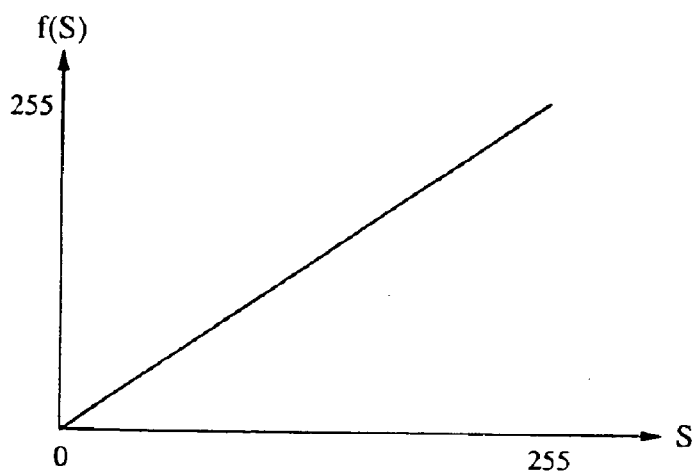
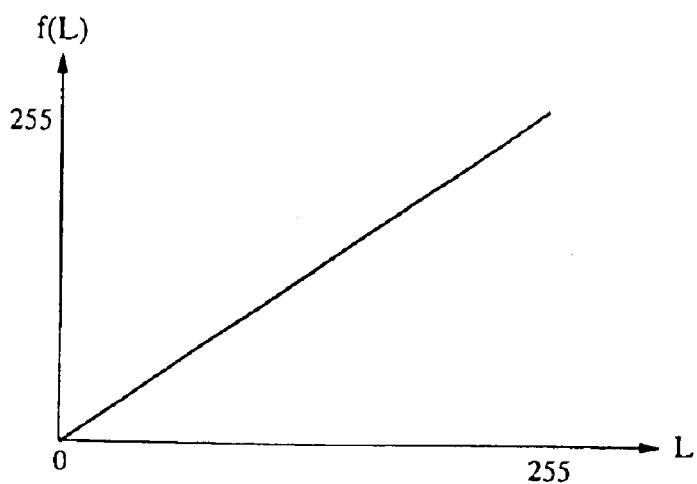

FIG. 15
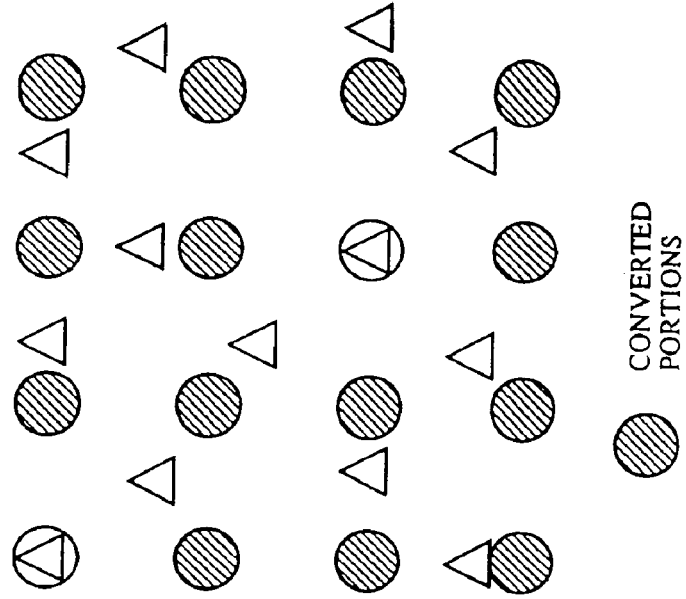
CONVERTED PORTIONS
WINDOW
$-10 \leq H \leq +10$
$240 - 15 \leq S \leq 240 + 15$
$100 - 50 \leq L \leq 100 + 50$
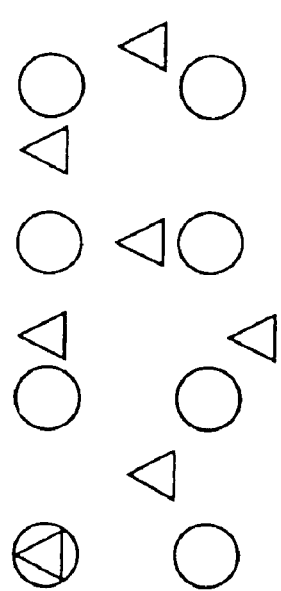
○ : H=0 S=255 L=128
△ : H=240 S=255 L=128
APPARENTLY PURPLE

IMAGE PROCESSING METHOD AND APPARATUS FOR CONVERTING COLORS IN A COLOR IMAGE

This application is a divisional of application Ser. No. 08/353,906, filed Dec. 12, 1994, now U.S. Pat. No. 6,434,266.

BACKGROUND OF THE INVENTION

1. Field of the Invention

The present invention relates to an apparatus and a method for processing color images and, more particularly, to a color image processing apparatus having a function of replacing a particular color in an original with a different color and a color image processing method using such a function.

2. Description of the Related Art

FIG. 6 shows a conventional color image processing apparatus.

Three color image signals R (red), G (green) and B (blue) representing an image are converted into an intensity signal I, a hue signal H and a saturation signal S by a matrix calculation in a coordinate transformation section 61. Comparators 62a to 62f compare the three signals with the intensity, hue and saturation, respectively, of a color set as a color to be converted. The color of the image represented by the signals is regarded as the "color to be converted". A selector 63 replaces the color of the image with a "color after conversion" if the comparison result is that the difference of each signal from the corresponding value of the set color is not larger than a predetermined value. The selector 63 outputs the unchanged original color if any one of the signals is largely different from the predetermined value.

In the above-described conventional image processing apparatus, colors before and after conversion are changed according to binary information as to whether a color of an original corresponds to a "color to be converted". Therefore, in a portion close to the boundary of the converted color, the colors before and after conversion may remain as mottles or speckles because of chattering due to reading non-uniformity or the like, resulting in a considerable deterioration in image quality.

Functions for converting colors of images include color conversion processing for converting a particular color of an original color image into a different color, monochromatic conversion processing for converting an image having a plurality of colors into a monochromatic image of a selected single color, color balance adjustment, and posterization for forming a poster-like image by reducing the number of colors of an image. In a color processing system, these kinds of processing can be practiced using independent circuits.

Regarding color conversion processing for changing a particular color in an original color image into a different color, a method described below is known as a method of discriminating a particular color. It is possible to identify the color of pixels by determining whether the ratios of red signal R, green signal G and blue signal B coincide with a range of predetermined ratios. For example, the largest one of R1, G1 and B1 is selected as a maximum value M1 to obtain the ratios of the other two values to M1. Then, if the following inequalities are satisfied, it is determined that the corresponding pixel has the same color as the particular color to be converted. For example, with respect to input pixel signals (R, G, B), if M1=R1, $$R \times (G/M1) \times \alpha 1 \leq G \leq R \times (G/M1) \times \alpha 2$$

$$R \times (B/M1) \times \beta 1 \leq B \leq R \times (B/M1) \times \beta 2$$

$$M1 \times \Gamma 1 \leq R \leq M1 \times \gamma 2$$

Each of $\alpha 1$, $\beta 1$ and $\gamma 1$ is a value equal to or smaller than 1, and each of $\alpha 2$, $\beta 2$ and $\gamma 2$ is a value equal to or larger than 1. Color identification allowances are determined by selecting these set values. If all the pixels whose colors are identified as the particular color are replaced with the color (R2, G2, B2), a color-converted image having a solid density is obtained.

It is also possible to convert a particular color while maintaining its gradation in such a manner that the largest one of R2, G2 and B2 (e.g., M2=G2) is selected to obtain the ratios of the other two values to the maximum value M2. This can be done by setting the R value to (M1×(R2/M2)), the G value to M1, and the B value to (M1×(B2/M2)).

Monochromatic conversion processing for converting an image having a plurality of colors into a monochromatic image of a selected single color is performed as described below. A designated color (R1, G1, B1) is converted into density signals (C1(cyan), M1 (magenta), and Y1 (yellow) and Bk1 (black)), and a maximum value MX in these values is stored. A signal ND (neutral density) representing a density is calculated by the following equation from density signals (C, M, Y) converted from input image signals (R, G, B). That is, $$ND=(C+M+Y)/3.$$

For example, if MX=C1, then the density (C0, M0, Y0, Bk0) of a target pixel which is presently processed is calculated by the following equations:

$$C0=ND \times MX$$

$$M0=ND \times (M1/MX)$$

$$Y0=ND \times (Y1/MX)$$

$$Bk0=ND \times (Bk1/MX).$$

Thus, it possible to change the density of an image while maintaining the same color.

Color balance adjustment for adjusting a color tone is performed in such a manner that different gain offsets set with respect to necessary colors are added to correction coefficients provided in an F correction table with respect to the colors which are used to adjust the tone of color when the colors are superposed.

For posterization, the lower 6 bits of each of R, G and B input signals, for example, are fixed to set four gradations for each color. In this case, it is possible to obtain a limited color image of 64 colors.

Conventionally, the above-described functions are performed by separate circuits. Therefore, the circuit scale and the manufacturing cost of the processing apparatus are increased if the number of functions is increased.

In a case where an ordinary user performs color balance adjustment, there is a need to convert, for example, an (R, G, B) system into a (C, M, Y, Bk) system and to perform adjustment operations with respect to each color component. For intuitive adjustment satisfying a demand for a "lighter", "slightly bluish" tone or the like, long experience and a great deal of skill are required.

There are two kinds of color adjustment processing: one in which an amount of change is set with respect to a particular color on an original selected as a color to be modified, and the selected particular color is modified by the set amount, and one in which all colors on the entire original surface are selected to be modified and are changed by equal amounts on a hue circle. However, no conventional color image processing system has both of these two kinds of adjustment processing.

In the case of color conversion processing on input color image data read from a halftone dot image formed by a color copying machine or the like, if the input color image data and a color to be converted are simply converted, and if the color is examined with respect to each pixel of the image, each pixel formed of non-superposed color dots cannot be determined as that same color as the color to be converted even if its color can be visually perceived as the same color. This is because of the specific formation of the halftone dot image in which constellations of dots having a plurality of colors are superposed in a staggered manner, resulting in failure to achieve accurate color conversion.

To solve this problem, a color conversion method has recently been practiced in which image data obtained by filtering an input color image read from a halftone dot image is used for determination of a color as a color to be converted.

In this conventional method, however, a filter used for such filtering is fixed and, therefore, image data after filtering, which is used for color identification, is limited to one set. Therefore, the image after color conversion cannot always be the same as the desired image imaged by an operator, and the converted color cannot be modified.

Moreover, since a uniform filter is used regardless of the number of lines of dots, there is a possibility of the accuracy of the image after filtering being reduced to such an extent that color identification cannot be made with the desired fidelity.

SUMMARY OF THE INVENTION

In view of the above-described problems, an object of the present invention is to provide a color image processing apparatus and a color image processing method which make it possible to suitably convert a color.

Another object of the present invention is to provide a color image processing apparatus in which the circuit scale of a color processing section is reduced.

Still another object of the present invention is to provide a color image processing apparatus which can be easily operated for color conversion processing.

A further object of the present invention is to provide a color image processing apparatus and a color image processing method which make is possible to obtain a color-converted image in which a color tone is smoothly converted even at a color boundary.

To achieve these objects, according to the present invention, there is provided a color image processing apparatus comprising means for generating a color image signal, first color designation means for designating an arbitrary color in the color image signal as a color to be converted, second color designation means for designating a color after conversion, and color conversion means for converting the color to be converted or a color similar to the color to be converted into the color after conversion or a color similar to the color after conversion.

Still another object of the present invention is to provide a color image processing apparatus having a novel function and a color image processing method using such a function.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a block diagram showing the configuration of a color conversion unit 104 of a second embodiment of the present invention;

FIG. 13 is a diagram of examples of conversion tables f(E), f(S), and f(L) for processing of "changing red into blue";

FIG. 15 is a diagram showing an example of a result of determination in the case of determining a particular color in a color halftone dot original;

DESCRIPTION OF THE PREFERRED EMBODIMENTS

The preferred embodiments of the present invention will be described in detail with reference to the drawings.

FIRST EMBODIMENT

Figure 1:
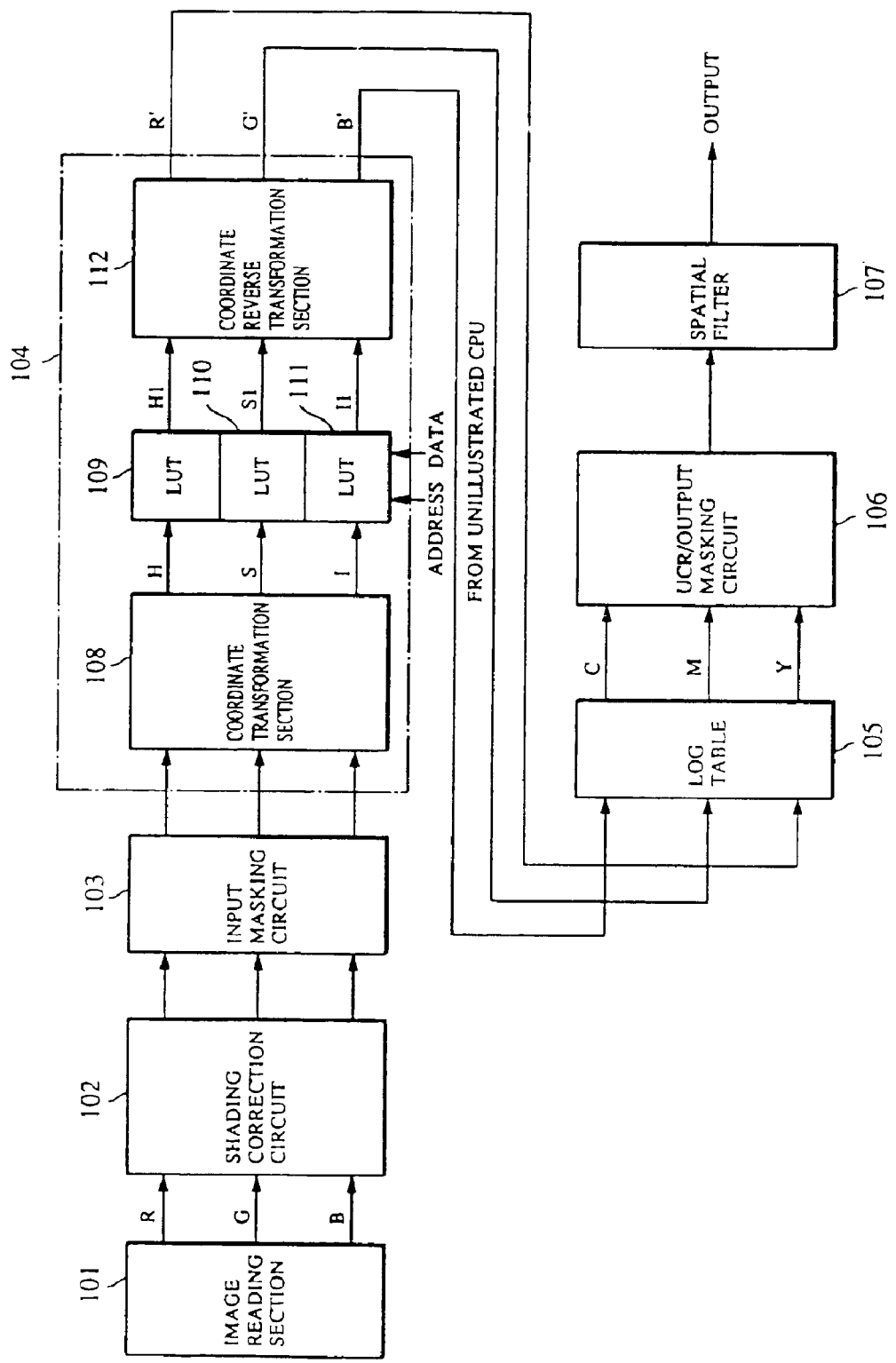
FIG. 1 is a block diagram of a first embodiment of the present invention.
Figure 2:
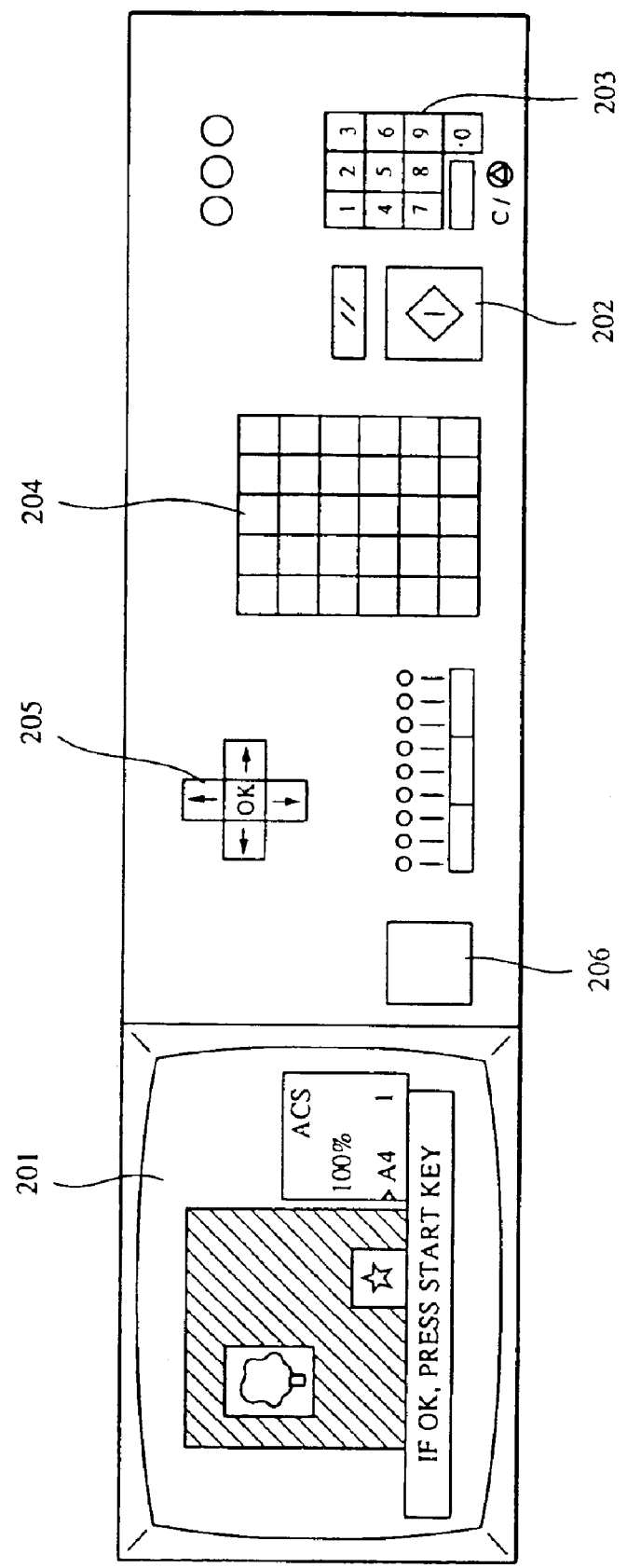
FIG. 2 is a diagram of the external appearance of an operating/display panel of a digital color copying machine in accordance with the first embodiment.

FIG. 1 shows an example of a circuit of a digital color copying machine in accordance with the first embodiment of the present invention, and FIG. 2 shows the external appearance of a display and an operating panel of the copying machine.

Referring to FIG. 2, the copying machine has an image display 201, a copying start key 202, a ten key cluster 203, function keys 204, and control keys 205.

When color conversion processing is started by operating the color conversion mode function keys 204 after setting an original, the original is scanned and an original image is displayed on the image display 201. A color before conversion and a color after conversion, which are selected from colors in the image or from color samples (not shown), are then designated by using a pointing device (not shown) such as a so-called mouse. An image converted in accordance with the designation is displayed. When the start key 202 is pressed, the displayed image is printed out.

If it is desirable to adjust the color-converted area and the designated color by observing the displayed image, the color conversion mode function keys 204 are operated to designate area adjustment or adjustment of the designated color. Thereafter, adjustment is made by using the ten key cluster 203 or control keys 205. The image after adjustment is displayed again on the image display 201, and the above-described process is thereafter repeated to output the resulting image.

Referring to FIG. 1, an image reading section 101 reads an original image and outputs digital signals which represent three colors, red (R), green. (G) and blue (B), and which are each an 8-bit signal. A shading correction circuit 102 corrects a nonuniformity of the reading section 101 and an optical system. An input masking circuit 103 calculates standard three color signals (NTSC-RGB signals in this embodiment) from three color image signals obtained from the image reading section. These signals are supplied to a color conversion unit 104. A LOG table 105 converts the light quantity signals R, G, and B into cyan (C), magenta (M) and yellow (Y) toner density signals. An UCR/output masking circuit 106 forms color recording signals C, M, Y, and Bk (black) from the density signals C, M, and Y in a surface sequential manner based on spectral characteristics of toners. A spatial frequency filter 107 makes edge enhancement, smoothing or the like according to one's need and outputs a final recording signal to a printer (not shown).

The color conversion unit 104 includes a coordinate transformation (RGB-HSI transformation) section 108 for forming three signals representing the hue (H (0 to 360°)), the saturation (S(0 to 255)), and the intensity (1(0 to 255)) of a color. These signals are formed by coordinate transformation of three colors signals R, G and B. Look-up tables (LUT) 109 to 111 convert the signals H, S and I into H1, S1 and 11, which are different from H, S and I signals, by using conversion tables previously set, and coordinate reverse transformation (HSI-RGB transformation) section 112 converts H1, S1 and 11 into signals on the original RGB coordinate system.

As mentioned above, when the start key is pressed after a point of a color before conversion and a corresponding point of a color after conversion have been designated, pre-scanning is started to read three color signals R, G and B of the designated two points from the image reading section 101. The colors before and after conversion are extracted from the points and are converted into coordinates on the HSI coordinate system by a CPU (not shown). Data is then written in the look-up tables 109 to 111 in such a manner that the color after conversion is output when the color before conversion is input. Thereafter, at the time of image formation by main scanning, an image in which the color has been converted by being passed through the LUTs is output.

Figure 3A:
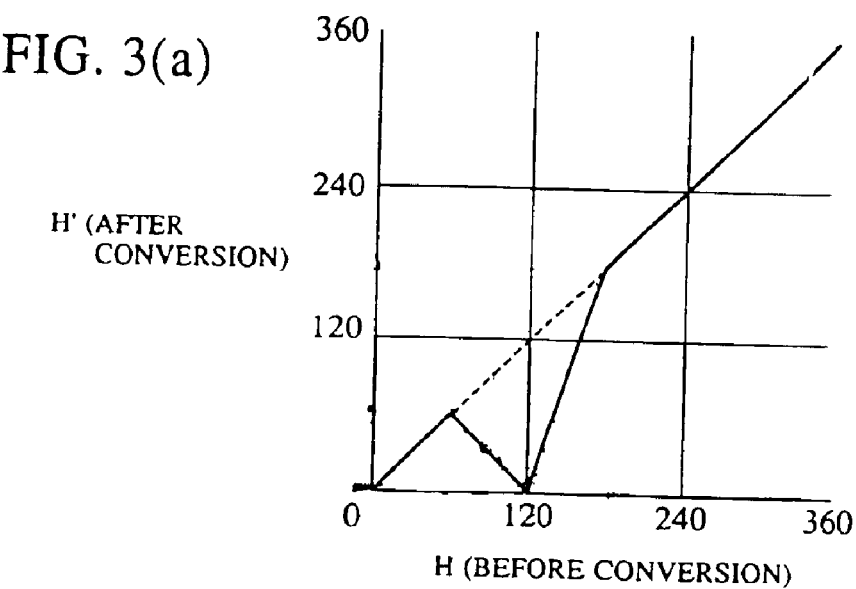
FIGS. 3(a), 3(b), and 3(c) are graphs of an example the content of a look-up table 109.
Figure 3B:
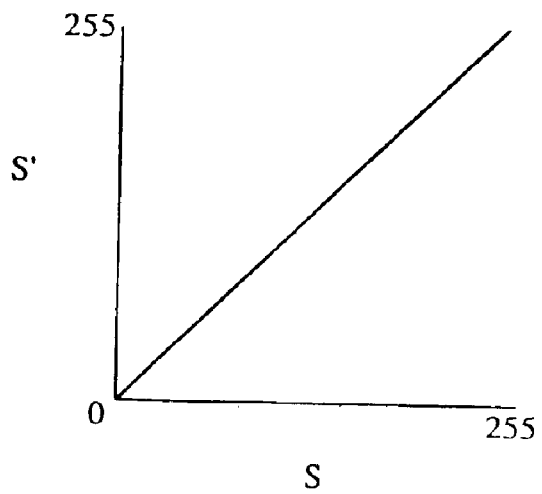
Figure 3C:
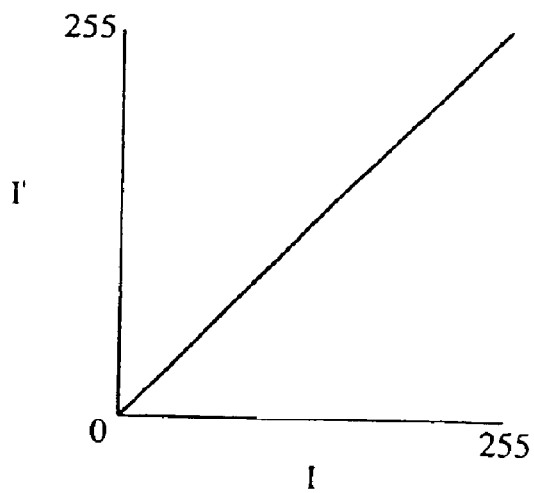

FIGS. 3(a), 3(b) and 3(c) show an example of the content of the LUT 109 shown in FIG. 1. In this example, only the hue H is converted from green (120°) to red (0°), while the saturation S and the intensity I are passed without being processed.

If the hue before conversion is closer to 120° (60 to 180°), the hue of the color after conversion is closer to 0°. At a position close to a boundary, the converted color is close to the color before conversion. Therefore, there is no possibility of occurrence of a color discontinuity even at the color boundary, and it is possible to obtain an apparently natural color-converted image. In this example, the width of the boundary areas is set to ±60°. However, this value is variable with respect to hues and is read out according to the designation of the hue before conversion from a ROM (not shown) in which boundary widths are previously written.

Needless to say, the content of the LUT is not limited to the example shown in FIGS. 3(a) to 3(C). In this embodiment, the result of conversion calculation is previously written in the LUTs. Alternatively, conversion can be made by calculations using an operational circuit or operational processor.

SECOND EMBODIMENT

FIG. 4 is a block diagram showing the configuration of color conversion unit 104 in accordance with the second embodiment of the present invention.

In the first embodiment, the hue H, the saturation S and the intensity I are independently converted by the LUTs 109 to 111, respectively. Alternatively, LUTs can be arranged in such a manner that two or three of the three coordinates are correlated. In such a case, in order to reduce the number of address bits of the LUTs, the number of bits of a main signal in the three signals input to the LUTs, e.g., signal H in the H conversion LUT, is maintained while the numbers of bits of other signals, e.g., signals S and I in the H conversion LUT, are reduced.

In this embodiment, 8 bits for a main signal and 3 bits for other signals, i.e., 14 bits in total, are input to each of HLUT 401, SLUT 402 and ILUT 403, and an 8-bit signal after conversion is output from each LUT.

If the three signals are converted by being correlated in this manner, color conversion of higher accuracy is possible. For example, if an operator wishes to convert a flesh color into a more reddish color, a higher degree of conversion is set for a portion of a slightly lower saturation in a main hue of the flesh color while a lower degree of conversion is set for a portion closer to orange (having a higher saturation). In this embodiment, the number of bits of the signals other than the main signal is reducing by using only upper bits. However, other various methods for reducing the number of bits are possible. For example, the signals other than the main signal may be converted into two-value signals by a comparator to input 10 bits in total to each LUT.

THIRD EMBODIMENT

In the first embodiment, if different kinds of processing are respectively performed on different areas of a color image, area signals are input for addressing in the LUTs, thereby facilitating processing.

If the coordinate transformation section 108 and the coordinate reverse transformation section 112 are arranged as hardware, there is a possibility of occurrence of an error or bit failure during calculation, which results in a deterioration in image quality. Therefore, the signals R, G and B may pass through the reverse coordinate transformation section 108 and the coordinate transformation section 112 without being processed if the input and the output of each LUT are equal to each other, thereby reducing deteriorations in image quality due to coordinate transformation.

Figure 5:
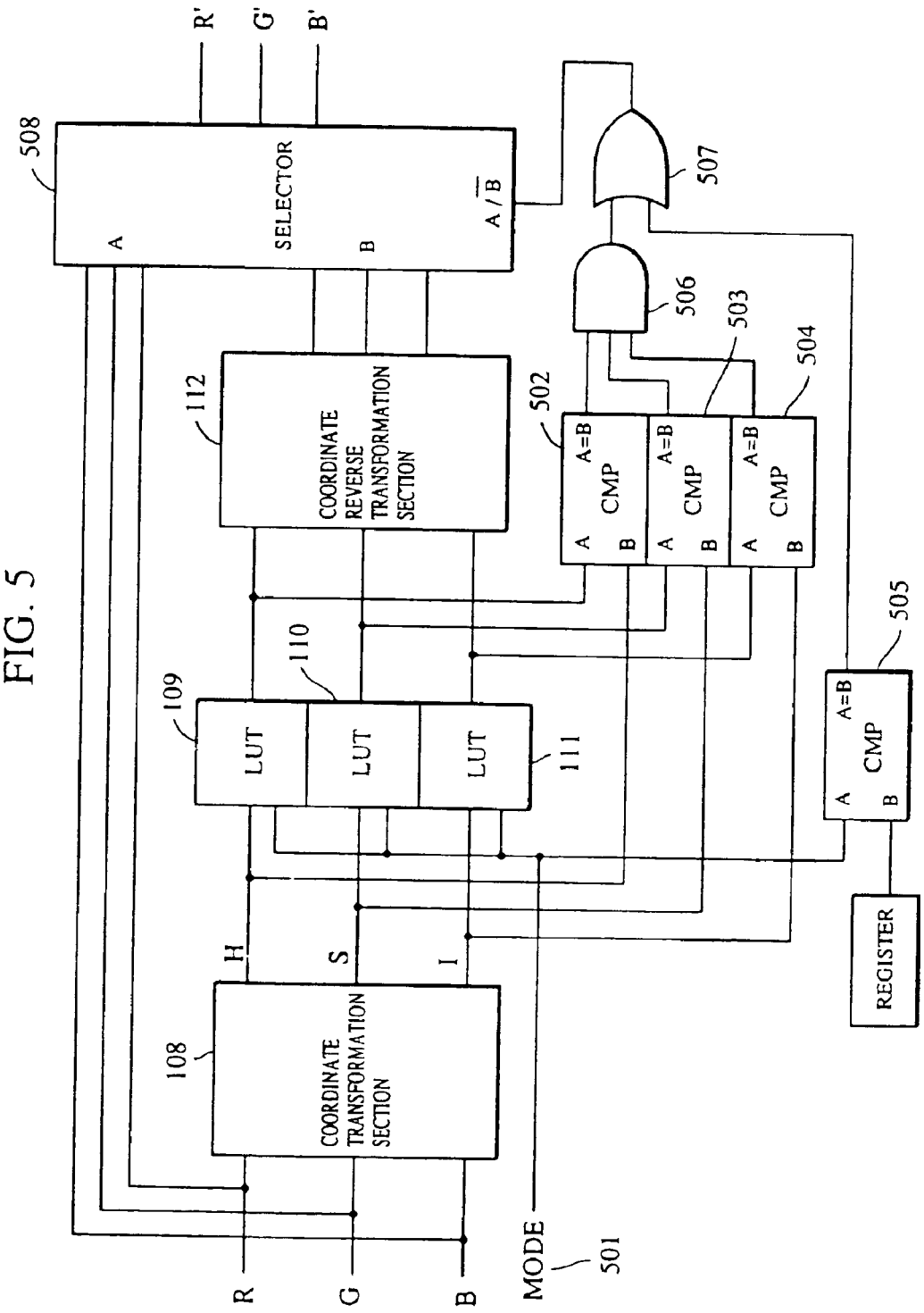
FIG. 5 is a block diagram of a color conversion unit 104 of a third embodiment of the present invention.
Figure 6:
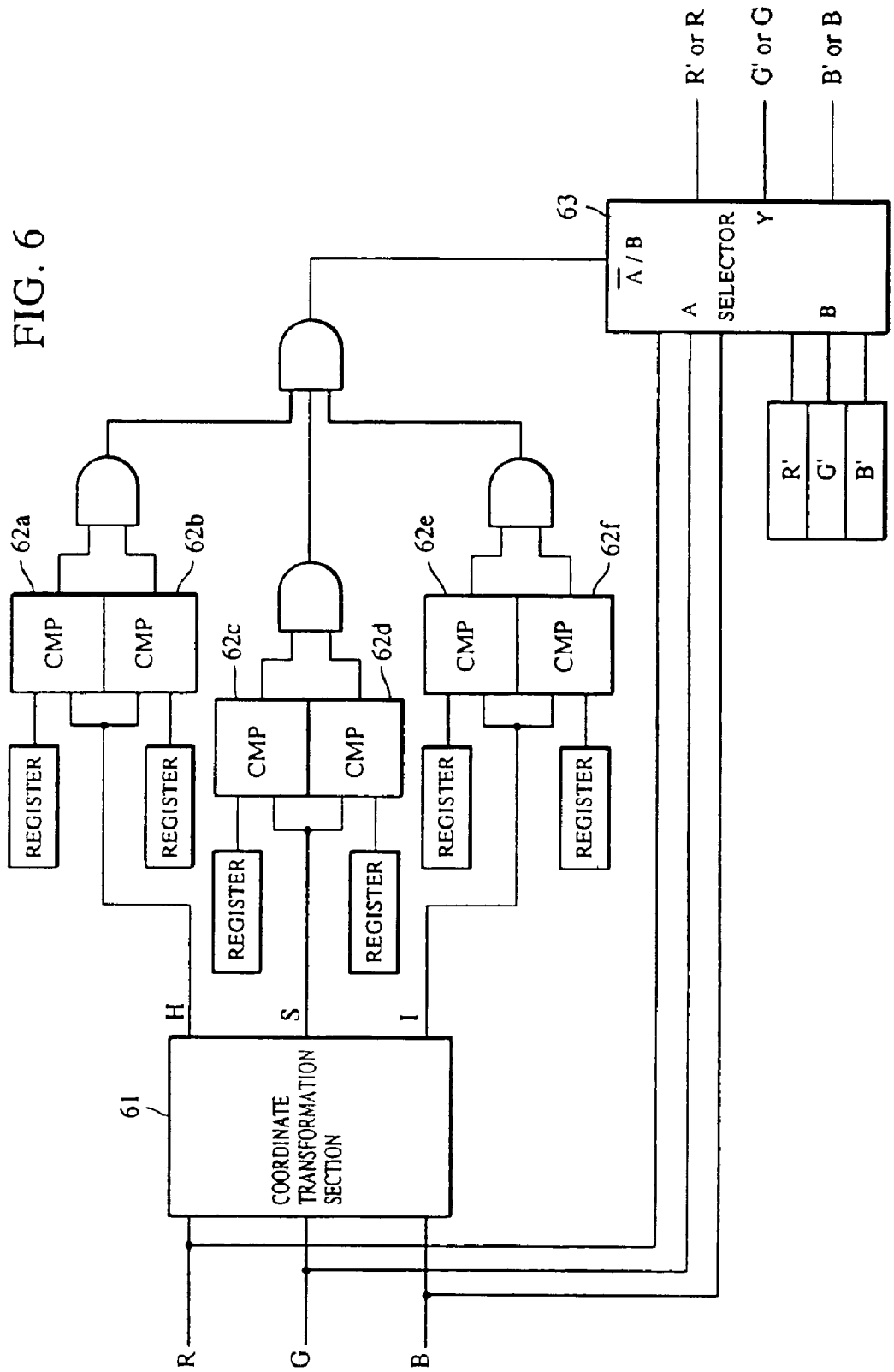
FIG. 6 is a block diagram of a conventional color image processing apparatus.

FIG. 5 shows the configuration of color conversion unit 104 in accordance with the third embodiment of the present invention. A signal MODE 501 designating a conversion mode is supplied. Each of comparators (CMP) 502 to 505 outputs 1 when its inputs are equal to each other, and outputs 0 when its two inputs are not equal. An AND gate 506, an OR gate 507 and a selector 508 are also provided.

The mode signal MODE is controlled by a CPU (not shown) to previously write in LUTs data for a color to be converted with respect to modes, i.e., areas, and a color after conversion. It is therefore possible to easily change the mode of conversion of colors before and after conversion by changing the mode signal with respect to areas.

On the other hand, in the comparators 502 to 504, the input and output signals of each LUT are always compared. If the input and output are equal to each other, "1", is output. If the input and output are different from each other, "0" is output. The three signals from the comparators 502 to 504 are supplied to the AND gate 506, and "1" is output from the AND gate 506 if these three signals are unchanged, that is, color conversion is not effected.

The comparator 505 determines whether the mode signal MODE has a predetermined value (representing a through mode). If a through mode is designated, the output from the comparator 505 is such that "1" is forcibly output from the OR gate 507.

The selector 508 is supplied with the signals R, G and B before conversion and is also supplied with the signals R, G and B which have undergone transformation/reverse transformation. The selector 508 outputs the signals before conversion (through signals) if the above-mentioned OR output is "1", and outputs the converted signals if the OR output is "0".

In this manner, areas where color conversion is to be performed and areas where color conversion is not be performed or the kinds of color conversion with respect to areas are changed. Also, it is possible to obtain outputs without causing any deterioration with respect to non-converted pixels or areas. Such areas are designated with a pointing device (not shown) such as a digitizer, mouse or the like.

In the first to third embodiments, as described above, input color image signals formed of three color-decomposed signals are converted into multivalued color tone signals having values representing the hue, saturation and intensity. The converted multivalued color tone signals obtained are further converted into previously-designated multivalued color tone signals by using at least one function for obtaining a continuous output from a continuous input, for example, as shown in FIGS. 3(a) to 3(c), and the converted multivalued color tone signals are again changed into three-color color-decomposed signals. It is therefore possible to obtain a good color-converted image in which a signal-changed boundary is unnoticeable.

Also, a determination is made as to whether the tone of a converted color is to be changed. The input color image signals are directly output as converted signals if it is determined that the color tone is not to be changed, and the three-color color-decomposed signals from the coordinate reverse transformation means are output as converted signals if it is determined that the color tone is to be changed. It is therefore possible to perform coordinate transformation without unnecessarily deteriorating the image.

FOURTH EMBODIMENT

In the fourth embodiment, a function conversion table for color conversion processing is rewritten to realize various kinds of color conversion processing using a single hardware arrangement.

Figure 7:
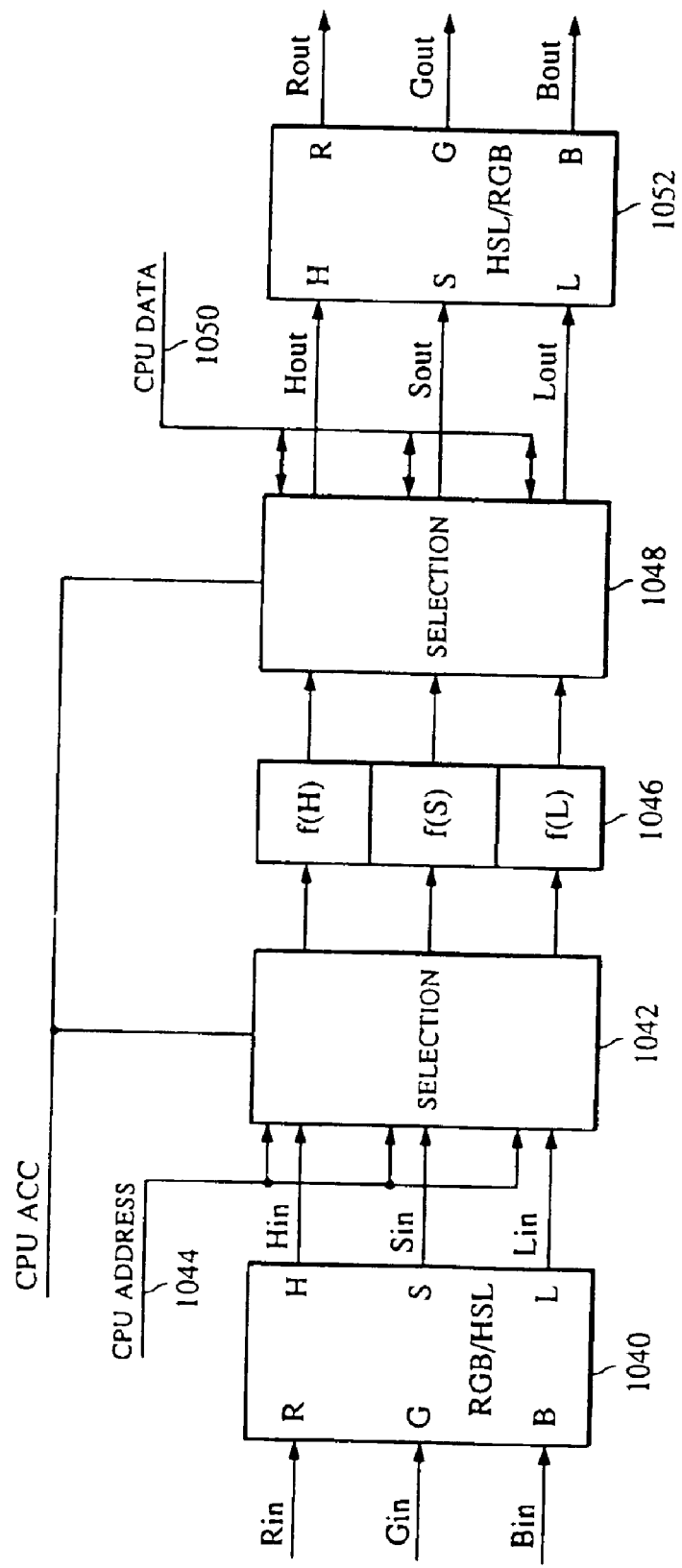
FIG. 7 is a block diagram schematically showing a fourth embodiment of the present invention.
Figure 8:
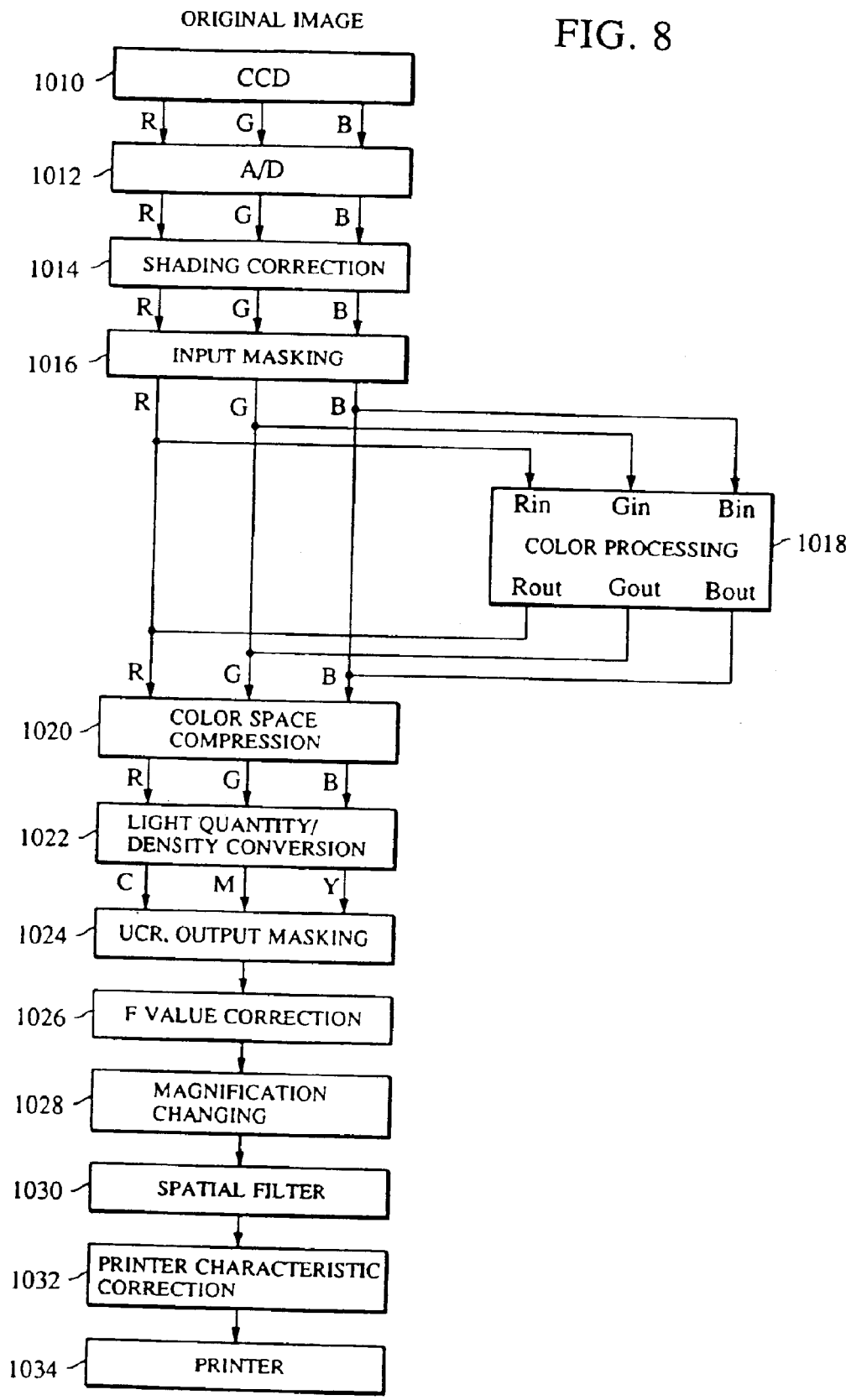
FIG. 8 is a block diagram showing image processing functions of a digital full-color copying machine utilizing the fourth embodiment.

FIG. 7 is a block diagram schematically showing the configuration of the fourth embodiment of the present invention, and FIG. 8 is a block diagram schematically showing functions of a digital full-color copying machine in accordance with this embodiment.

Referring first to FIG. 8, blocks representing functions of a digital full-color copying machine to which this embodiment is applied are illustrated with respect to the flow of processing. A 3-line CCD line sensor 1010 color-decomposes reflected light from an original to convert the image light into electrical signals. An A/D converter 1042 converts analog output signals R, G and B from the line sensor 1010 into digital signals. A shading correction circuit 1014 corrects an output non-uniformity with respect to each color of the line sensor 100 and the inclination of the quantity of light from a light source. An input masking circuit 1016 corrects RGB spectroscopic characteristics of the sensor 1010 on a standard RGB space.

A color processing circuit 1018 performs various kinds of conversion of colors. The color processing circuit 1018 has a circuit configuration shown in FIG. 7. A color space compression circuit 1020 compresses image signals distributed in the standard RGB space into signals in a color space range such that the read image can be reproduced by an output unit (printer). A light quantity/density conversion circuit 1022 converts an RGB brightness signal into density signals representing the densities of cyan (C), magenta (M) and yellow (Y). An under color removal (UCR) and output masking circuit 1024 corrects the three color density signals C, M and Y according to spectral characteristics of toners, forms a black signal Bk, and outputs the signals one by one in a surface sequential manner in accordance with recording colors in the printer.

An F value correction table 1026 corrects the density value (F value) of each color in accordance with a density designation. A magnification changing circuit 1028 changes the size of the processed image. A spatial frequency filter 1030 processes the image for edge enhancement or smoothing. A printer characteristic correction table 1032 corrects the image signals (the output from the spatial frequency filter 1030) to be output for printing according to color tone characteristics of a connected printer 1034.

In the digital full-color copying machine, an original image read by the line sensor 1010 undergoes various kinds of processing shown as functional blocks in FIG. 8 and is thereafter output as a print from the printer 1034.

The circuit shown in FIG. 7 is used as color processing circuit 1018 shown in FIG. 8. A coordinate transformation circuit 1040 shown in FIG. 7 converts an RGB color space into an HSL color space in terms of hue (H), saturation (S) and lightness (L). As shown in FIG. 7, coordinate transformation circuit 1040 outputs signals Hin, Sin and Lin with respect to input signals Rin, Gin and Bin supplied from the input masking circuit 1016. A selection circuit 1042 selects the outputs Hin, Sin and Lin from the conversion circuit 1040 or HSL color space data on a CPU bus 1044 (CPU address bus).

A function conversion circuit 1046 converts color components, i.e., the hue (H), the saturation (S) and the lightness (L) from the selection circuit 1042, by functions f(H), f(S) and f(L), respectively. The function conversion circuit 1046 includes a RAM in which a function conversion table is stored. Inputs are given as addresses in the RAM and outputs are obtained as table values. The function conversion table is rewritten according to color processing described below by using CPU data with CPU addresses output from the CPU. A line CPUACC is set to high level when the function conversion table is rewritten. When the level of CPUACC is low, rewriting is not performed, and the outputs from the coordinate transformation circuit 1040 are directly output to the function conversion circuit 1046.

A selection circuit 1048 selects signals or data according to the level of CPUACC. That is, the selection circuit 1048 directly outputs the outputs from the function conversion circuit 1046 when the level of CPUACC is low, and selects data on a CPU data bus 1050 to write this data in the table of function conversion circuit 1046 if the level of CPUACC is high. A coordinate reverse transformation circuit 1052 returns the color components in the HSL color space output from the selection circuit 1048 to the RGB color space. Outputs Rout, Gout and Bout from the coordinate reverse transformation circuit 1052 are applied to the color space compression circuit 1020 shown in FIG. 8.

Figure 9:
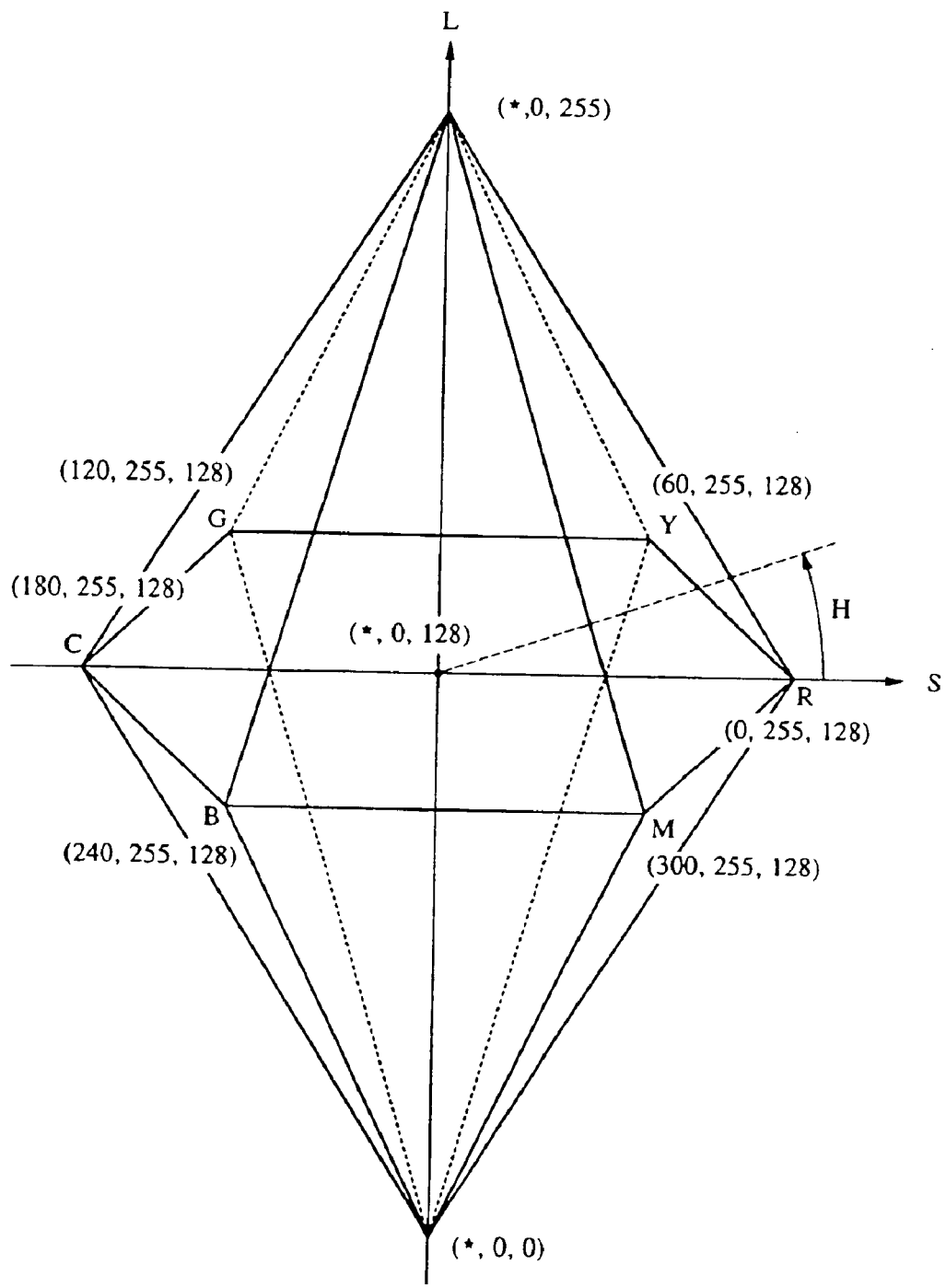
FIG. 9 is a diagram of an HSL color space used in the embodiment shown in FIG. 7.

FIG. 9 illustrates the HSL color space used for the coordinate transformation circuit 1040 and the coordinate reverse transformation circuit 1052. By well-known calculations, 8-bit image signals R, G and B in the RGB color space are converted into H (0 to 360°), S (8 bits) and L (8 bits). The coordinate transformation circuit 1040 and the coordinate reverse transformation circuit 1052 can be set to pass the signals therethrough without processing. The function conversion circuit 1046 can also be utilized to convert the RGB image.

Means for forming a monochromatic image in any selected color with the circuit shown in FIG. 7 will be described with respect to the following cases (1) and (2) by way of example.

Case (1): where it is desirable to maintain the lightness L and to fix the hue H and the saturation S at certain values.

In this case, color information (H0, S0, L0) for a desired single color (designated color) is set by being sampled from an original image during pre-scanning or by being selected therefrom, and the following values are written in the function conversion circuit 1046:

f(H)=H0 (constant)

f(S)=S0 (constant)

f(L)=L (through).

The input image consisting of Rin, Gin and Bin is input to the function conversion circuit 1046 through the circuits 1040 and 1042, and the hue H and the saturation S are fixed at constant values H0 and S0 in the function conversion circuit 1046. The outputs from the function conversion circuit 1046 are applied to the coordinate reverse transformation circuit 1052 through the selection circuit 1048 to be returned to the RGB space. The image represented by the outputs Rout, Gout and Bout from the coordinate reverse transformation circuit 1052 is such that the lightness of the input image is maintained while the hue and the saturation of the input image are fixed at constant values.

In this conversion process, "black" in the original is still "black" after conversion. Pixels having the same color as the designated color are the same color before and after conversion.

Case (2): where the lightness L is compressed with "black" in the original related to a "designated color".

In this case, f(H)=H0 (constant), f(S)=S0 (constant), and f(L)=(L×(255−L0)/225)+L0 are set in the function conversion circuit 1046. L0 is a constant which determines the lowest lightness after conversion and the inclination of compression. In this example of conversion, "black" in the original is converted into a designated color having the lowest lightness.

Even if the value of hue H is constant, it is possible that the resulting color will be seen as a different color due to a printer characteristic, a deformation of the color space or other causes. Functions f(H), f(S) and f(L) formed by considering correction functions may be set in the function conversion circuit 1046.

In this embodiment, HSL posterization, for example, can easily be realized by changing the functions f(H), f(S) and f(L) set in the function conversion circuit 1046. In such a case, f(H)=int(H/30), f(S)=S0 (constant) (when S=0)=int(S/128) (S#0), and f(L)=int(L/64)

are set in the function conversion circuit 1046. IInt ( ) is a function for obtaining an integer, as is well known.

In the case of hue/saturation/contrast adjustment, f(H)=H+δH, f(S)=S+δH, and f(L)=L+δL are set. δH, δS and δL are bias or offset values for adjustment. δH, δS and δL may be set to constant values or may be varied with respect to the input hue, saturation and lightness.

The combination of the kinds of processing described above can be realized by using a composite function of the functions for the processing. It is apparent that other kinds of processing can be realized by suitably setting functions f(H), f(S) and f(L). Further, posterization for reducing the gradations of each color in the RGB space and solarization for inverting the gradations of each color at an intermediate point can also be realized by setting the coordinate transformation circuit 1040 and the coordinate reverse transformation circuit 1052 to a through state.

The embodiment has been described with respect to an example of coordinate transformation from an RGB color space to an HSL color space. However, coordinate systems having three coordinates of the hue, saturation and lightness are not limited to the above-described example. For example, conversion from an L*a*B space into a polar coordinate system can also be utilized.

Figure 10:
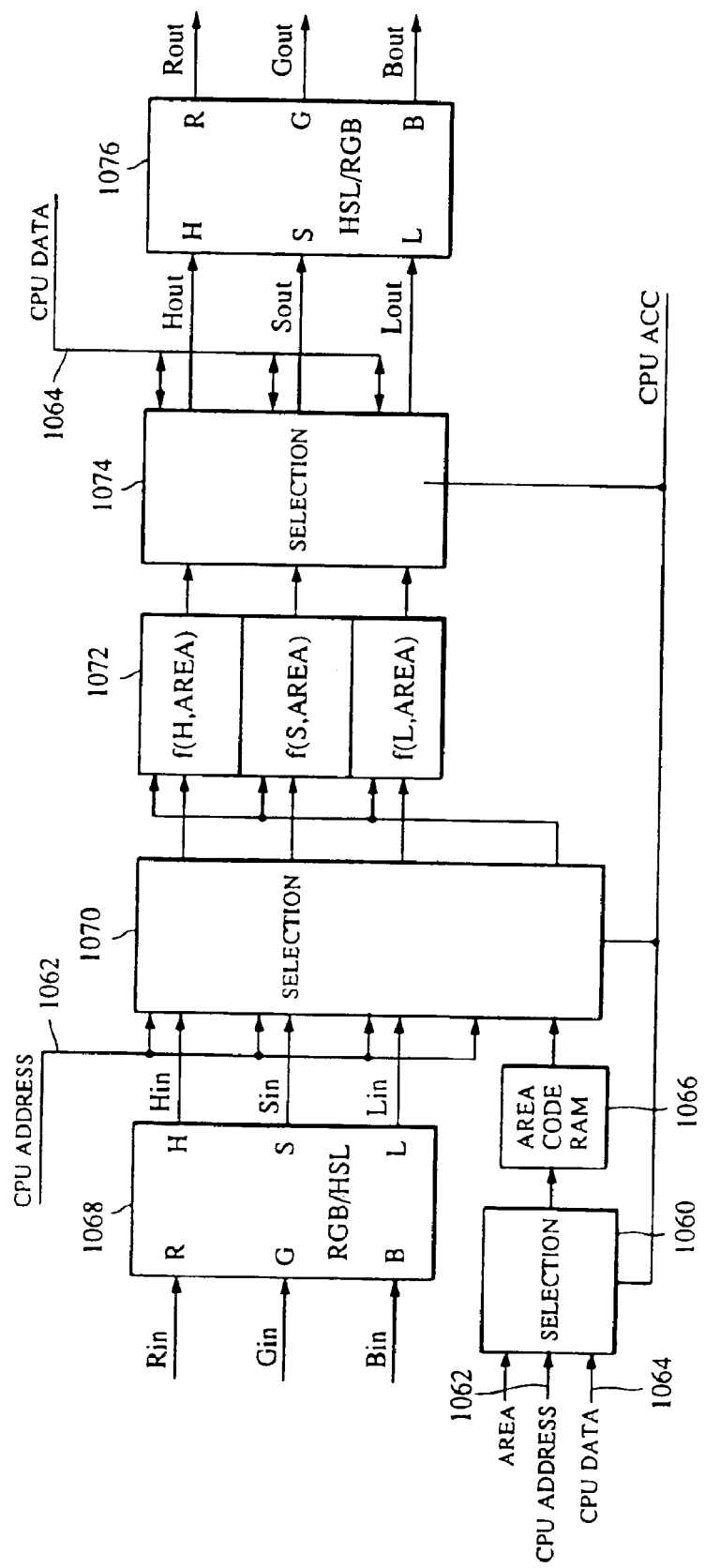
FIG. 10 is a block diagram schematically showing a circuit arranged to change color conversion processing with respect to arbitrary areas of an image.

To enable each of the above-described functions to be set for an arbitrary area in one picture frame, the processing system may be arranged so that the function for the desired conversion can be selected with respect to each designated area. FIG. 10 is a block diagram schematically showing an example of a circuit configuration arranged for such a selecting function.

Figure 22:
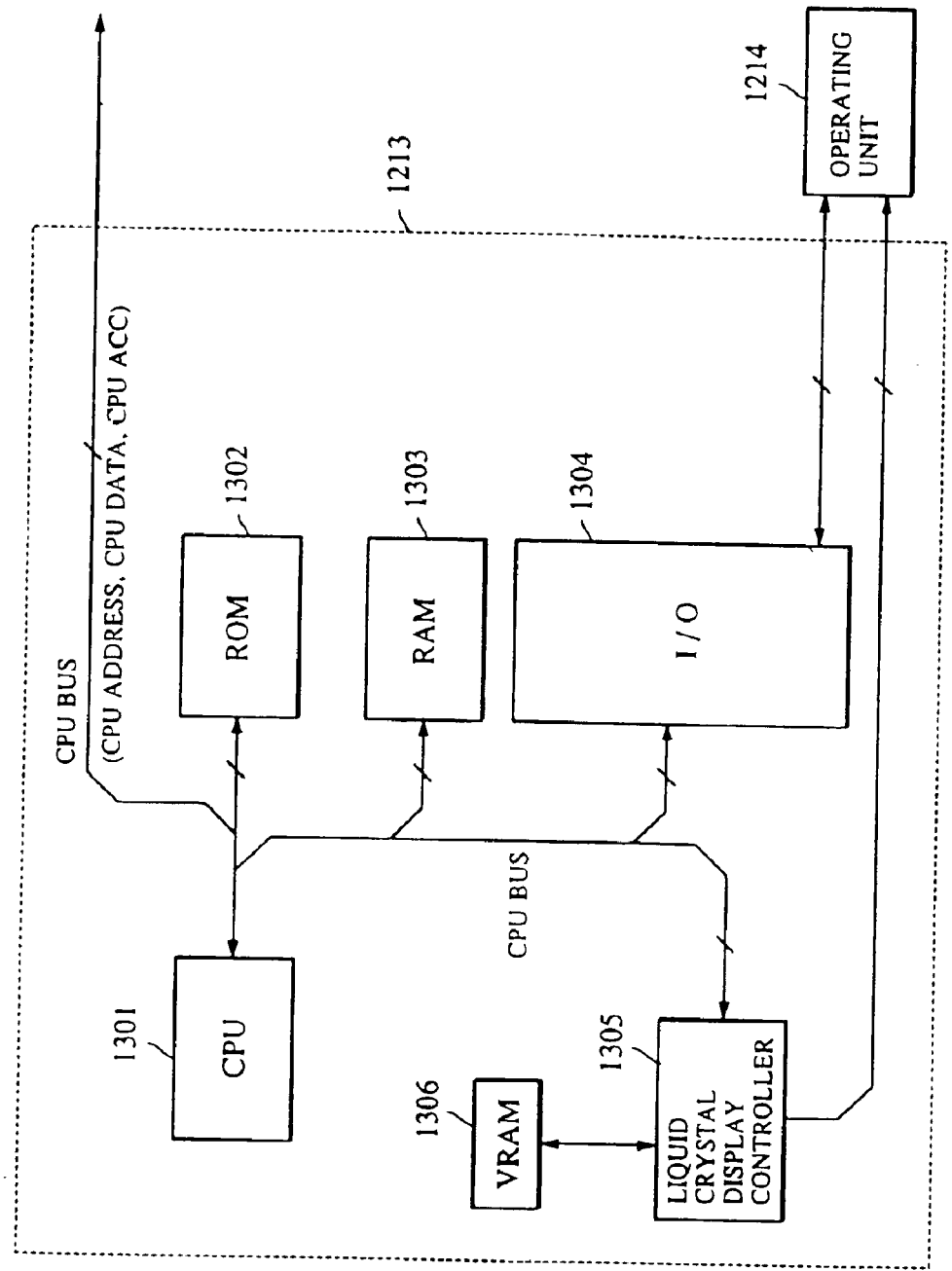
FIG. 22 is a block diagram of a control unit 1213.

Referring to FIG. 10, a selection circuit 1060 selects an area code signal AREA which is generated in synchronization with the input image signal and which designates a place in one picture frame where the presently-processed pixel exists, or a CPU address (address bus) 1062 or CPU data (data bus) 1064 output from a CPU such as that shown in FIG. 22. An area code RAM 1066 has a table for generating a designation signal for designating a function used in a function conversion circuit 1072 at a rear stage in accordance with the signal AREA output from the selection circuit 1060.

Processing code data input through the CPU data bus 1064 with addresses designated through the CPU address bus 1062 are previously written in the area code RAM 1066. The area code RAM 1066 is supplied with the signal AREA and selects and outputs, in accordance with the signal AREA, a processing code which designates a kind of processing performed by the function conversion circuit 1072. This processing code is input to upper bits in a function conversion RAM used in the function conversion circuit 1072.

The area designation operation may be performed by the same method as in the first embodiment.

A coordinate transformation circuit 1068 which is the same as the coordinate transformation circuit 1040 is provided. A selection circuit 1070 selects outputs Hin, Sin and Lin from the coordinate transformation circuit 1068 and an output from the area code RAM 1066, or HSL color space data on the CPU bus 1062 (CPU address bus) and data in place of the output from the area code RAM 1066.

The function conversion circuit 1072 converts color component data, i.e., the hue (H), the saturation (S) and the lightness (L) by using functions f (H, AREA), f(S, AREA), f(L, AREA) in accordance with the selection output from the selection circuit 1070 and the area code. A selection circuit 1074 selects outputs from the function conversion circuit 1072 or data on the CPU bus (data bus) 1064. A coordinate reverse transformation circuit 1076 returns to the RGB color space the color component signal in the HSL color space output from the selection circuit 1074. Outputs Rout, Gout and Bout from the coordinate reverse transformation circuit 1076 are applied to the color space compression circuit 1020 of FIG. 8.

Function conversion data is previously written in the function conversion circuit 1072. The desired function data input through CPU data bus 1064 is written in the function conversion circuit 1072 with addresses input through CPU address bus 1062. This function data is determined by a user's input operation through a panel (not shown) and is written in lower bits of the function conversion RAM.

The area code signal AREA designates an area where the present target pixel exist in synchronization with the image signal. The area code signal AREA is input to the area code RAM 1066 through the selection circuit 1060. In the area code RAM 1066, the codes designating various kinds of processing to be effected on arbitrary designated areas are previously written. The output from the RAM 1066 corresponds to upper bits of the function conversion RAM used for the function conversion circuit 1072. By changing the processing codes, the conversion functions used in the function conversion circuit 1072 can be changed with respect to areas, thereby enabling plural kinds of color processing to be performed with respect to arbitrary areas in one picture frame. In other respects, the operation of this circuit is the same as that of the circuit shown in FIG. 7.

Figure 11:
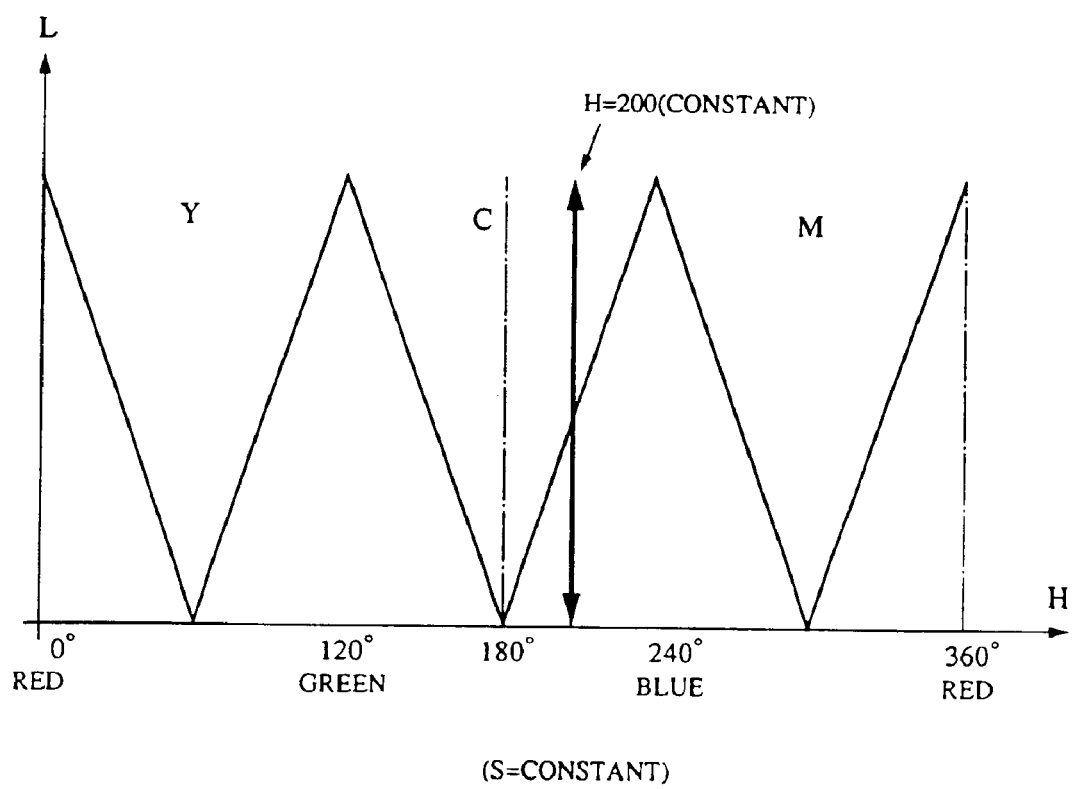
FIG. 11 is a diagram showing an example of a visually-recognizable color change depending upon the hue.

In the HSL coordinate system of the embodiment shown in FIG. 7, it is possible that a printed color will vary largely depending upon values S and L even when one value of H is designated, because of a characteristic of the system. FIG. 11 shows an example of the relationship between L and the apparent hue. In this example, if a user's color of H=200° is set, the color is seen as if it is changed closer to cyan under a dark (small lightness) condition even though the color is selected as blue under a light (large lightness) condition.

Figure 12:
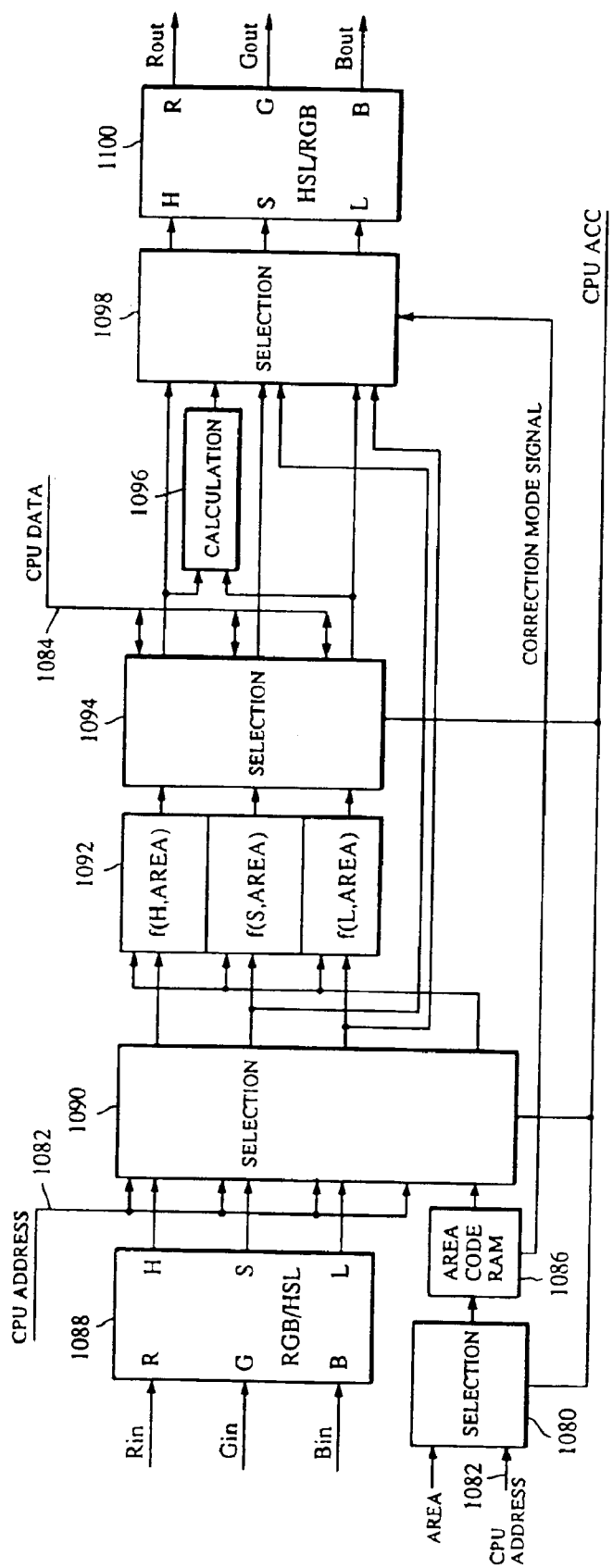
FIG. 12 is a block diagram schematically showing a circuit arranged to use a lightness conversion table as a hue correction coefficient table.

Therefore, in the case of converting H through the full range of L (hue conversion and user's color), it is desirable to utilize an L conversion table as an H correction coefficient table so that the characteristic of the coordinate system is corrected. FIG. 12 shows a circuit configuration of color processing circuit 1018 realizing this function.

Referring to FIG. 12, a selection circuit 1080 selects area code signal AREA designating the area where the target pixel exists or a CPU address (address bus) 1082. An area code RAM 1086 outputs a selection signal for selecting a function used for function conversion and a 1-bit correction mode signal in accordance with an output from the selection circuit 1080. Codes (address signals) for designating functions for function conversion to be performed on each area and the correction mode signal designating the existence/non-existence of correction for the designated area are previously stored in the area code RAM 1086.

There are provided a coordinate transformation circuit 1088 which is the same as coordinate transformation circuit 1040, a selection circuit 1090 which is the same as selection circuit 1070, and a function conversion circuit 1092 which is the same as function conversion circuit 1072. A selection circuit 1094 selects outputs from the function conversion circuit 1092 or data on a CPU bus (data bus) 1084, as in the case of selection circuit 1074.

A calculation circuit 1096 calculates H and L components in selection outputs from the selection circuit 1094. A selection circuit 1098 selects H component, S component and L component outputs from the selection circuit 1094 or an output from the calculation circuit 1096, an S component output from the selection circuit 1090 and an L component output from the selection circuit 1090 according to the correction mode signal output from the area code RAM 1086. A coordinate reverse transformation circuit 1100 returns the output of the selection circuit 1098 from the HSL color space to the RGB color space, as in the case of coordinate reverse transformation circuit 1076. Outputs Rout, Gout and Bout from the coordinate reverse transformation circuit 1100 are applied to the color space compression circuit 1020 of FIG. 8.

Processing in each of the circuits 1088,1090, 1092 and 1094 is the same as that in the corresponding circuits shown in FIG. 10. When an H correction mode is selected, the area code RAM 1086 outputs an address change signal so as to change the address of f (L, AREA) in the function conversion circuit 1092 from the address in the L conversion table in which it is stored to that in the H correction coefficient table. The function conversion circuit 1092 thereby outputs an L component output and an H correction coefficient during the time in the H correction mode. The calculation circuit 1096 calculates the H component output from f (H, AREA) with the H correction coefficient output from f(L, AREA) and outputs a corrected H signal. The selection circuit 1098 selects the outputs in accordance with the correction mode signal from the area code RAM 1086 (1 bit in the output from the area code RAM 106 (which is 1 in the correction mode)). That is, it selects both H and L converted in the ordinary manner at the time of calculation involving L which is during the time other than the time in the correction mode. Selection circuit 1098, in the H correction mode, L and S which are in the same state as before being input to the circuit 1092. As a result, during the correction mode, the selection circuit 1098 outputs signals in which the S and L components are not changed and only the hue has been corrected. Thus, the variation in color depending upon the lightness can be reduced in the case of setting the hue uniformly through the full lightness range.

In the arrangement shown in FIG. 12, the L conversion table and the H correction table are combined to reduce the circuit scale. However, the hue correction means is not limited to this arrangement. For example, a correction circuit may be provided before the H conversion function to correct the lightness L and the hue H and, if necessary, the saturation S before the function conversion.

During modes other than the H correction mode, the selection circuit 1098 selects and outputs the H component output, the S component output and the L component output from the selection circuit 1094. In other respects, the operation and effect are the same as those of the arrangement shown in FIG. 10.

In the case of processing, for example, for changing "red into blue" in the embodiment shown in FIG. 7, conversion functions, i.e., conversion tables, such as those shown in FIG. 13, are used to convert all colors having hues close to red from "white" to "black" into blue. On the other hand, there is a need for a color processing function for "changing only very red into blue" by limiting both the saturation and the brightness. To realize such a function, the processing system may be arranged in such a manner that the values of the signals H, S and L and the values of signals representing a "particular color" are compared by a window comparator, and color conversion is made only when each component is within a certain range about the particular color.

Figure 14:
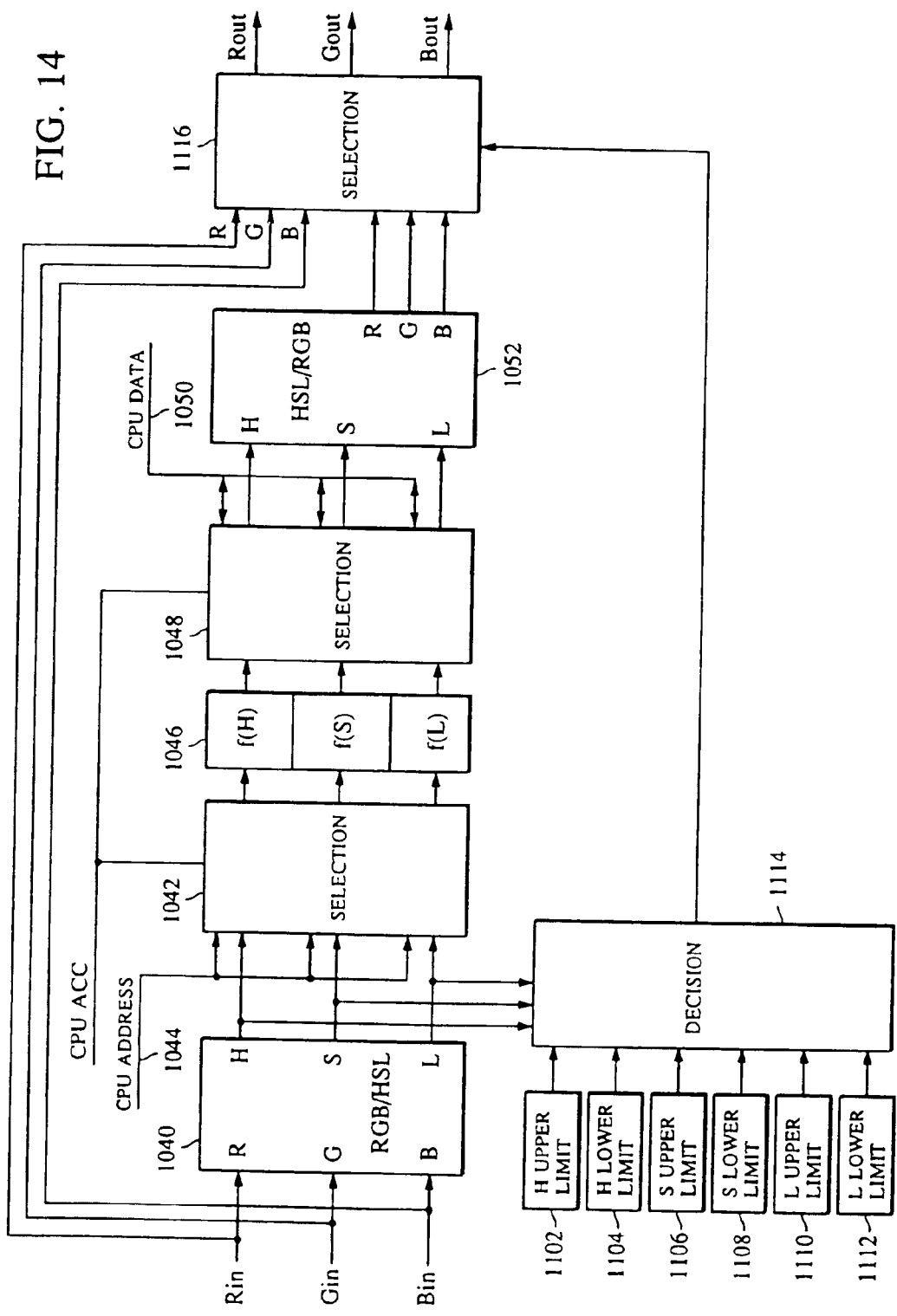
FIG. 14 is a block diagram schematically showing a circuit arranged to set a converted color through three components, i.e., hue, lightness and saturation values.

FIG. 14 is a block diagram schematically showing the configuration of an example of color processing circuit 1018 arranged in such a manner. The same components as those shown in FIG. 7 are indicated by the same reference characters. Registers 1102 and 1104, 1106 and 1108, and 1110 and 1112 hold upper and lower limit values of the hue H, upper and lower limit values of the saturation S, and upper and lower limit values of the lightness L. A decision circuit 1114 compares the values H, S and L output from the coordinate transformation circuit 1040 with the corresponding upper and lower limits values held by the registers 1102 to 1112 to determine whether each component is within the designated range. The registers 1102 to 1112 and the decision circuit 1114 constitute a window comparator.

A selection circuit 1116 selects RGB outputs from coordinate reverse transformation circuit 1052 if the decision circuit 1114 determines that each of H, S and L is within the designated range. The selection circuit 1116 selects inputs Rin, Gin and Bin if any one of H, S and L is not within the corresponding designated range. Outputs from the selection circuit 1116 are obtained as the outputs Rout, Gout and Bout from color processing circuit 1018.

The decision circuit 1114 compares the value H output from the coordinate transformation circuit 1040 with the upper and lower limit values in the registers 1102 and 1104, the value S output from the coordinate transformation circuit 1040 with the upper and lower limit values in the registers 1106 and 1108, and the value L output from the coordinate transformation circuit 1040 with the upper and lower limit values in the registers 1110 and 1112. The decision circuit 1114 outputs "1" when all the values H, S and L are within the corresponding ranges limited by the upper and lower limits, and outputs "0" if any of the values H, S and L is out of the corresponding range. The selection circuit 1116 selects the RGB outputs from the coordinate reverse transformation circuit 1052 when the output from the decision circuit 1114 is "1", and selects inputs Rin, Gin and Bin when the output from the decision circuit 1114 is "0".

It is possible to selectively realize, for example, a function of erasing only red-penciled portions in a corrected original (designating "red" and replacing the corresponding portion with white) and a function of leaving only red-penciled portion (designating "red" and replacing the portion other than red with white) by converting the output from the decision circuit 1114 according to one's need.

With respect to the case of detecting "red" and the case of detecting "white" for color conversion, it is necessary to change the upper and lower limit values of the registers 1102 to 1112.

For example, it is assumed here that in the case of detection of "red (H=0, S=255, L=128)",

−10≦H≦10

255−50≦S≦255+50

128−50≦L≦128+50 have been set by the registers 1102 to 1112. If the processing system is operated to detect "white (H=indefinite, S=0, L=255)" under the same setting, then only "white" accidentally recognized as a color having a hue value close to the set value among "white", with which, intrinsically, no hue cannot be set (in other words, any hue value can be set), will be selected, thereby resulting in a mottled image. Moreover, even a portion having a substantially high density, i.e., an L value of about 50, can be selected. To prevent this problem, if a value close to "white" is selected as a "particular color", the window setting may be changed so that H=whole range (or no range designation)

−10≦S≦10

255−10≦L≦255+10.

The method of changing the window setting is not limited to this. Colors vary in recognizability. For example, a change in a light color can be recognized more easily than a corresponding change in a dark color, and an apparent change in "blue" is smaller than a corresponding change in "red". If the window setting values are changed by considering these facts, the effect of discrimination of a particular color by processing becomes closer to the effect of discrimination with human eyes.

Actually, tables of "particular colors" and "window setting values" are prepared for a CPU shown in FIG. 22 and described below, and the CPU automatically selects window setting values, i.e., the values held by the registers 1102 to 1112 according to the designation of a "particular color" from a user.

In a case where a particular color of a color halftone dot original image, such as a printed matter, is determined by the window, the particular color is determined at dot-like areas in correspondence with the halftone dots, as shown in FIG.

Figure 16:
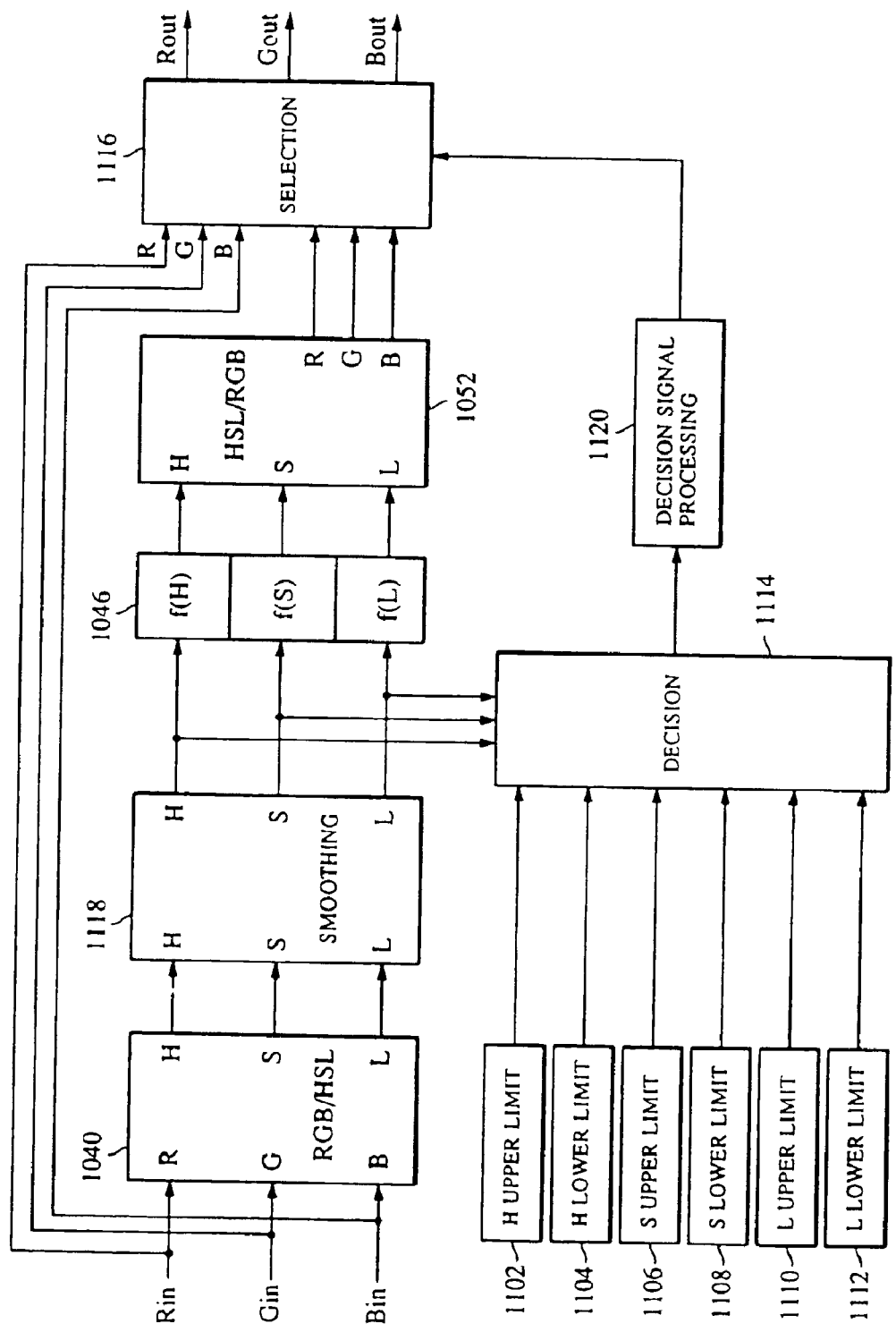
FIG. 16 is a block diagram schematically showing a color conversion circuit having a smoothing function for smoothing a halftone dot image before converting the image.

15, so that the color after conversion is visually recognized as different from the designated color. In such a situation, the resulting image may have a certain roughness. Therefore, a smoothing circuit is provided for processing before the coordinate transformation. Color determination is made after the values R, G and B, or H, S and L have been smoothed, whereby the portions of the image which are visually recognized and the color portions thereof determined by processing become substantially equal to each other. FIG. 16 is a block diagram schematically showing an example of a circuit configuration realizing this effect. In the arrangement shown in FIG. 16, in comparison with the arrangement shown in FIG. 14, a smoothing circuit 1118 is provided at a stage after the coordinate transformation circuit 1040. Also, a decision signal processing circuit 1120 for processing the determination result from the decision circuit 1114 is provided, and the selection circuit 1116 is controlled by the output from the decision signal processing circuit 1120. The selection circuits) 1042 and 1048 are removed since they are unnecessary.

In this example, the resolution of an input image represented by Rin, Gin and Bin is 400 dpi, and 5×5 smoothing circuit 1118 smoothes dots formed at a density of 133 to 175 dpi, which corresponds to the density of dot screen lines of ordinary printed matters. The decision signal processing circuit 1120 thickens or thins image portions having decision result non-uniformity at the boundaries between colors by majority operation or the like. In other respects, the operation and effect of this arrangement are the same as those of the arrangement shown in FIG. 14.

In a portion of the smoothing circuit 1118 where the hue signal H is processed, the hue signal H is rotated through 360° one time. Therefore, a preprocessing circuit for calculating the actual range of the signal value is provided at this portion along with a common product/sum calculation circuit for processing the signals S and L as well as the signal 11.

In the arrangement shown in FIG. 16, non-color-processed image signals are output with respect to pixels other than the pixels corresponding to designated areas, thereby reducing the unnecessary reduction in resolution due to smoothing by the smoothing circuit 1118. Alternatively, the signals smoothed by the smoothing circuit 1118 may be input only to the decision circuit 1114 in order to reduce the reduction in resolution due to smoothing.

In the arrangement shown in FIG. 16, the HSL signals are smoothed. However, the arrangement may alternatively be such that input RGB signals Rin, Gin and Bin may be smoothed before being converted into HSL signals and undergoing determination processing in the decision circuit 1114.

Figure 17:
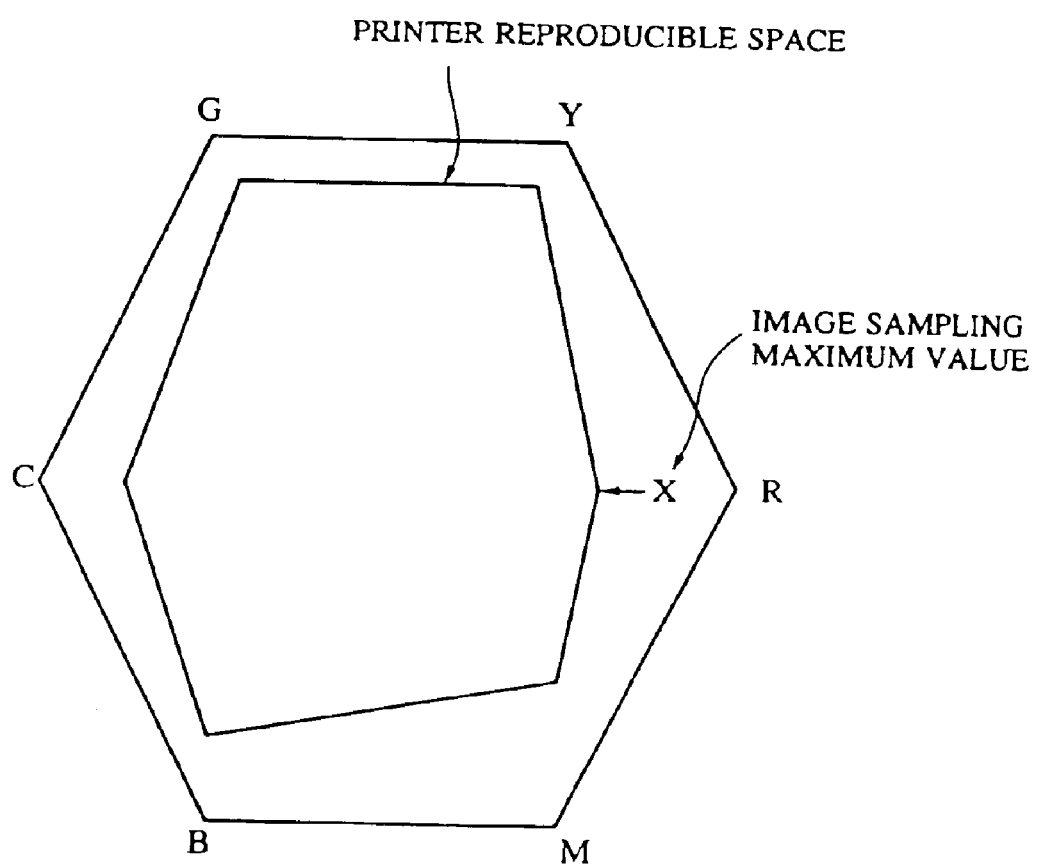
FIG. 17 is a diagram of a color space.

It is apparent that the color space compression circuit 1020 shown in FIG. 8 can be integrally combined with the color processing circuit 1018 arranged as described above. FIG. 17 shows a color space in the case where the color space compression circuit 1020 is integrally combined with the color processing circuit 1018. During pre-scanning, a signal value representing the maximum saturation S in each of hues of 0°, (R), 60° (Y), 120° (G), 180° (C), 240° (B) and 300° (M) is sampled. This value is compared with the corresponding maximum value of the printer reproducible color space. If the image contains a value not reproducible by the printer, the saturation component of the corresponding hue component is compressed to be made reproducible.

When each color processing function is executed, the color space compressing function obtained by pre-scanning and the-function for the processing are combined and written in RAMS of conversion circuits 1046, 1072 and 1092.

In the fourth embodiment of the invention, as can be easily understood from the above, RGB signals are converted into values in a cylindrical coordinate system consisting of the hue, the saturation and the lightness of colors. Various kinds of conversion processing are performed in this coordinate system, thereby realizing multiple functions with a single hardware arrangement. Also, advantageously, an operator can intuitively designate a color effectively.

FIFTH EMBODIMENT

A color image processing apparatus in accordance with the fifth embodiment of the present invention will be described which has both a first adjustment function of adjusting a color by designating a particular color to be converted and by setting a degree of conversion, and a second adjustment function of setting the entire surface as colors to be converted and changing the set colors by equal amounts on the hue circle. This apparatus has the same circuit configuration as that shown in FIG. 8.

Figure 18A:
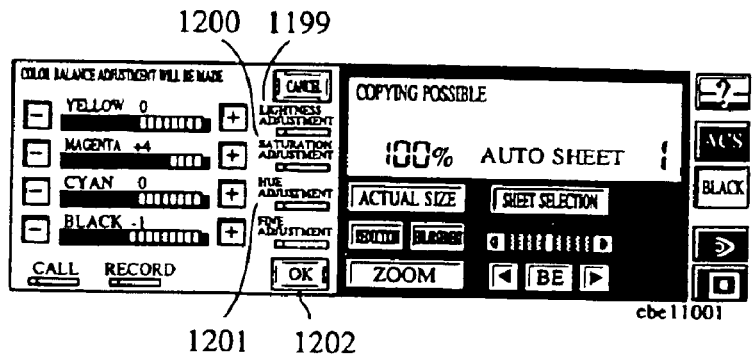
FIGS. 18(a) through 18(d) are diagrams showing an operating unit when hue adjustment processing is performed in accordance with a fifth embodiment of the present invention.
Figure 18B:
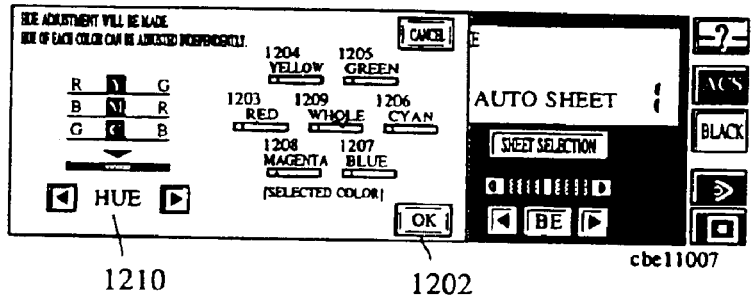
Figure 18C:
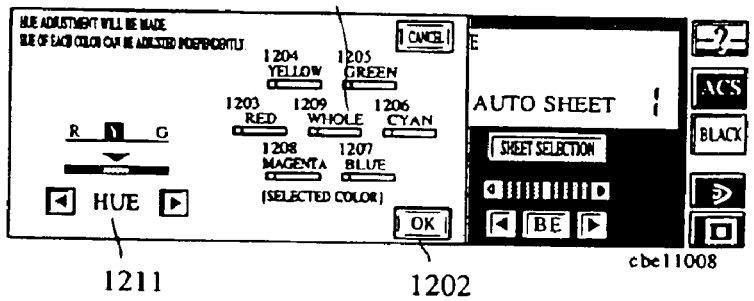

An example of the operation for hue adjustment will be described below. FIGS. 18(a) through 18(d) show examples of displays on an operating unit. First, when a "color adjustment hard key" (not shown) is operated, a graphic image such as that shown in FIG. 18(a) is displayed. Then, "HUE ADJUSTMENT" 1201 is selected and "OK" 1202 is operated. A graphic image such as that shown in FIG. 18(b) is thereby displayed. A hue to be adjusted on an original is selected from "RED", "YELLOW", "GREEN", "CYAN", "BLUE", "MAGENTA" and "WHOLE" by operating corresponding selected color keys 1203 to 1209 in the displayed graphic image. In the initial state of setting through the graphic image shown in FIG. 18(b), "WHOLE" is selected and hue adjustment of all colors is set if the selecting operation is omitted. If "WHOLE" 1209 is selected, all the colors on the original are converted by equal amounts on the hue circle according to an adjustment value designated by "FINE HUE ADJUSTMENT KEYS" 1210 on the left-hand side of FIG. 18(b). If "YELLOW" 1204 is selected and designated as a color to be adjusted, a graphic image is displayed which contains "FINE HUE ADJUSTMENT KEYS" 1211 for setting the direction and the number of steps of adjustment of each selected color on the hue circle, as shown in FIG. 18(c). In this embodiment, "FINE HUE ADJUSTMENT KEYS" 1211 are operable to change the color three steps at the maximum from a standard point in the direction of each of the adjacent hues, for example, red and green if the selected color is yellow. After the desired value has been designated by the "FINE HUE ADJUSTMENT KEYS" 1210 or 1211, "OK" 1202 is operated to complete the setting, thereby starting copying.

Figure 19:
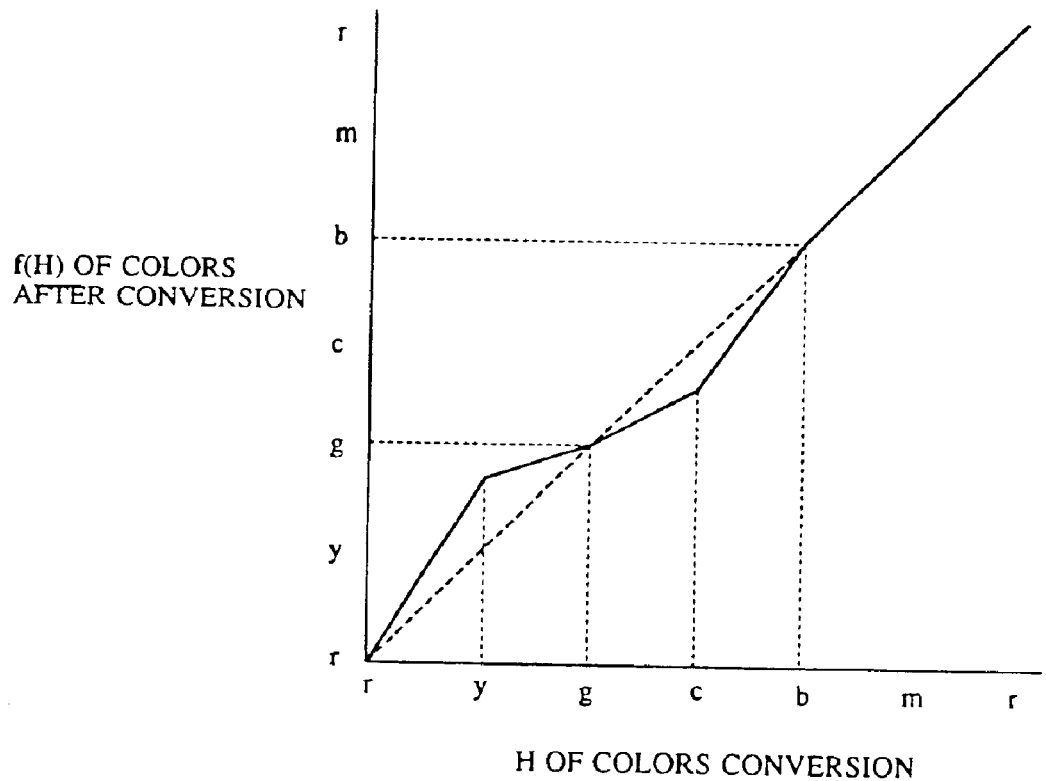
FIG. 19 is a graph of an H-f(H) characteristic when Y is changed two steps in the direction G while C is changed one step in the direction G.

FIG. 19 is an H-f(H) graph showing a characteristic of conversion between colors before and after conversion in the function conversion circuit 1046 shown in FIG. 7 in a case where Y is changed two steps in the direction G while C is changed one step in the direction G. The hue is changed through ten degrees by one step of the operating unit. In this example, the entire surface offset=0, Y is changed by +2, C is changed by −1, and the other hues are not changed. Accordingly, the value of change in each hue is determined as shown in FIG. 19, and H between each adjacent pair of hues is calculated by interpolation calculation. Simultaneously with the start of copying, this content is set in the function conversion circuit 1046, and the hues of read image data are converted by the function conversion circuit 1046. Each of saturation adjustment and lightness adjustment is executed by rewriting the contents of f(S) and f(L) in the same manner.

Figure 18D:
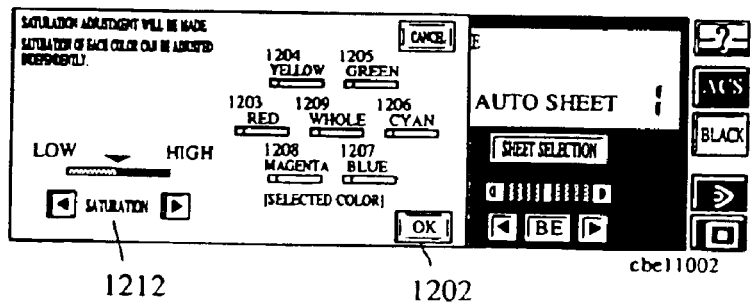

FIG. 18(d) shows an example of an adjustment graphic image in the case of saturation adjustment. Also in the case of saturation adjustment, the entire original or selected colors are designated with "SELECTED COLOR" keys 1203 to 1209, as in the case of hue adjustment, and an adjustment degree is set with "FINE SATURATION ADJUSTMENT KEYS" 1212, thereby enabling saturation adjustment to be started. Lightness adjustment can also be performed by selecting "LIGHTNESS ADJUSTMENT" 1199 and by performing the same operations as for saturation adjustment. The amount of adjustment is not limited to that described above and may be an amount of gain adjustment as represented by f(x)=αX, or an amount expressed by any other function, as well as an offset expressed by f(X)= X+δX (X: H, S, L). Some of these kinds of adjustment (for example, hue adjustment and saturation adjustment) may be set in combination with each other.

As described above, hue adjustment, saturation adjustment and lightness adjustment are possible with respect to any or all colors on an original. Further, since each adjustment can be set by the function conversion circuit 1046, combined adjustment can easily be performed by using a composite function.

Consequently, color adjustment can be performed freely and conveniently.

A case of changing color adjustment processing with respect to arbitrary areas in an image frame using the circuit shown in FIG. 10 will now be described. The area code signal AREA shown in FIG. 10 is a signal which is synchronized with the input image signal and which designates the area in the image frame where the presently-processed pixel exists, as mentioned above. The signal AREA is input to the area code RAM 66 through the selection circuit 1060. Codes designating processing performed on arbitrary designated areas are previously stored in the RAM 1066. The output from the RAM 1066 is input as upper bits in the function conversion RAM used for the function conversion circuit 1072. It is possible to change the conversion function used in the function conversion circuit 1072 by changing the processing codes and to apply plural kinds of color processing to arbitrary areas in one image frame.

A case of designating two areas and performing hue adjustment on the first area and saturation adjustment on the second area will be described below by way of example. FIGS. 20(a) through 20(d) show operating graphic images successively displayed in a case where area designation is made.

Figure 20A:
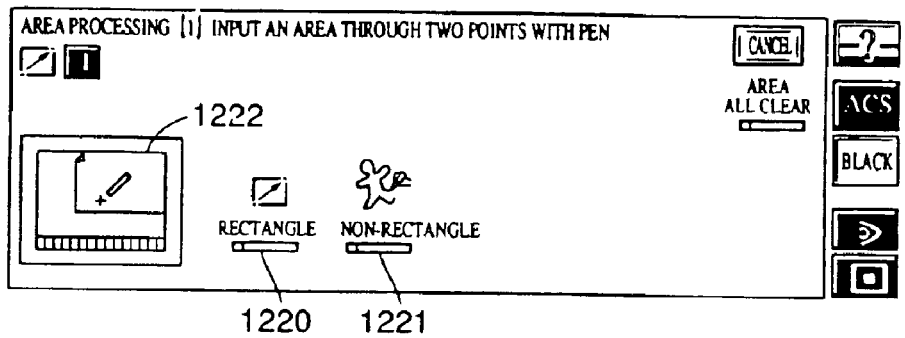
FIGS. 20(a) through 20(d) are diagrams of an operating unit when area designation processing is performed.
Figure 20B:
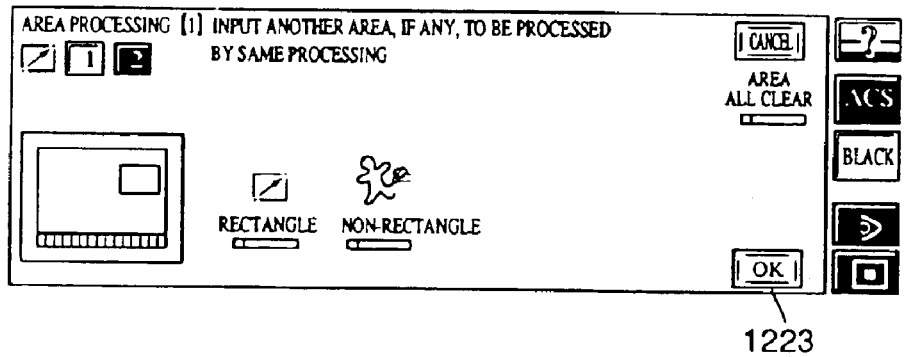
Figure 20C:
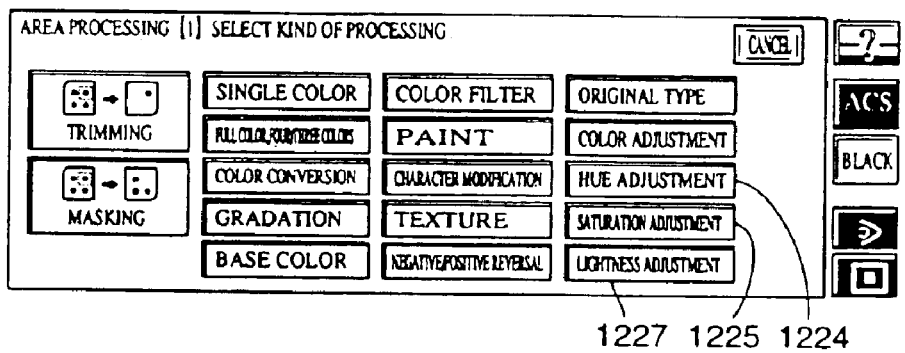

First, an "area designation" hard key (not shown) is operated to display the graphic image shown in FIG. 20(a) on the operating unit. One or more areas, e.g., areas 1 and 2, where colors are to be adjusted, are designated in a "WINDOW" 1222 corresponding to the surface of an original with a digitizer by selecting "RECTANGLE" 1220 or "NON-RECTANGLE" 1221. The area 1 is first input. When the designation of area 1 is completed and "OK" key 1223 is displayed as shown in FIG. 20(b), "OK" key 1223 is operated. Then, various kinds of processing from which one to be performed on area 1 is selected are displayed in the graphic image shown in FIG. 20(c), and "HUE ADJUSTMENT" key 1224 is selected in this case (on the main unit side, by referring to this selection, a functional code for "HUE ADJUSTMENT" is set with address 1 (representing area 1) in the area code RAM 1066).

Parameter setting at the time of hue adjustment is the same as that described above with reference to FIGS. 18 and 19.

Figure 20D:
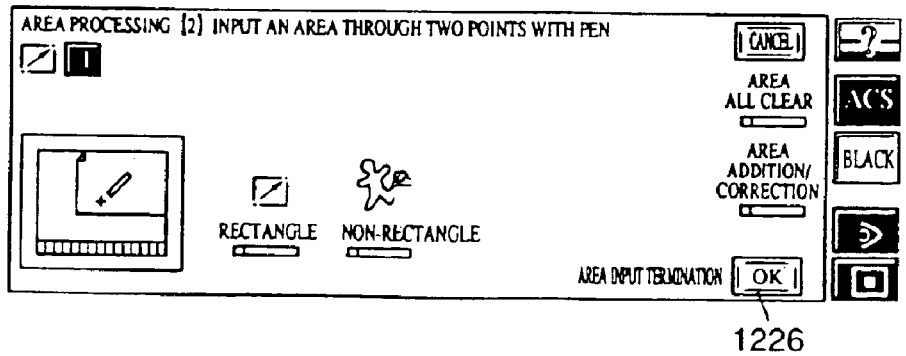

When the setting of area 1 is completed, the graphic image shown in FIG. 20(d), for inputting the next area, is displayed. Subsequently, area 2 is designated and saturation adjustment is designated as processing to be performed on area 2 with "SATURATION ADJUSTMENT" key 1225, followed by setting the necessary parameters. If the setting for the desired processing is completed, "OK" key 1226 is operated without inputting another area from the input image. Area input operation is thereby terminated. Lightness adjustment can also be performed by the designation operation with "LIGHTNESS ADJUSTMENT" key 1227 in the same manner.

As described above, a plurality of areas can be set on the input image, and various kinds of adjustment selected as desired can be respectively performed on the areas. Thus, it is possible to perform various kinds of adjustment on any areas.

As described above, this embodiment is provided with a designation means for selecting one of a set of particular hue components or a set of all hue components as a hue to be adjusted and a setting means for setting a rate of change in a hue component or a saturation component of an image signal corresponding to the adjusted hue designated by the designation means. The foregoing embodiment permits color adjustment of an image to be performed freely and conveniently.

A particular one of colors of an original and the hues of all the colors in the original can be mixedly adjusted, for example, by designating the particular color as a color to be adjusted, setting a rate of change of a component to be changed, and thereafter color-converting all of the hues of the color image on the hue circle by equal amounts.

SIXTH EMBODIMENT

The sixth embodiment of the present invention will now be described in which variable smoothing is performed for color conversion of a halftone dot image to achieve high-accuracy color conversion. The construction of the apparatus of this embodiment is the same as that shown in FIG. 8.

FIG. 22 is a block diagram of a control unit 1213 usable in the above-described embodiments and connected to the CPU buses (CPU address bus, CPU data bus).

A microcomputer or a central processing unit (CPU) 1301 controls the overall image processing operation. A program for operating the CPU 1301 is stored in a ROM 1302. A RAM 1303 is used as a work area for executing various programs. An input/output port (hereinafter referred to as I/O port) 1304 is connected to the CPU 1301. A liquid crystal display controller 1305 serves to control a liquid crystal display device mounted on an operating unit 1214. A VRAM 1306 stores data displayed on the liquid crystal display device. The content of the VRAM 1306 can be rewritten by the CPU 1301 through the liquid crystal display controller 1305.

Figure 21:
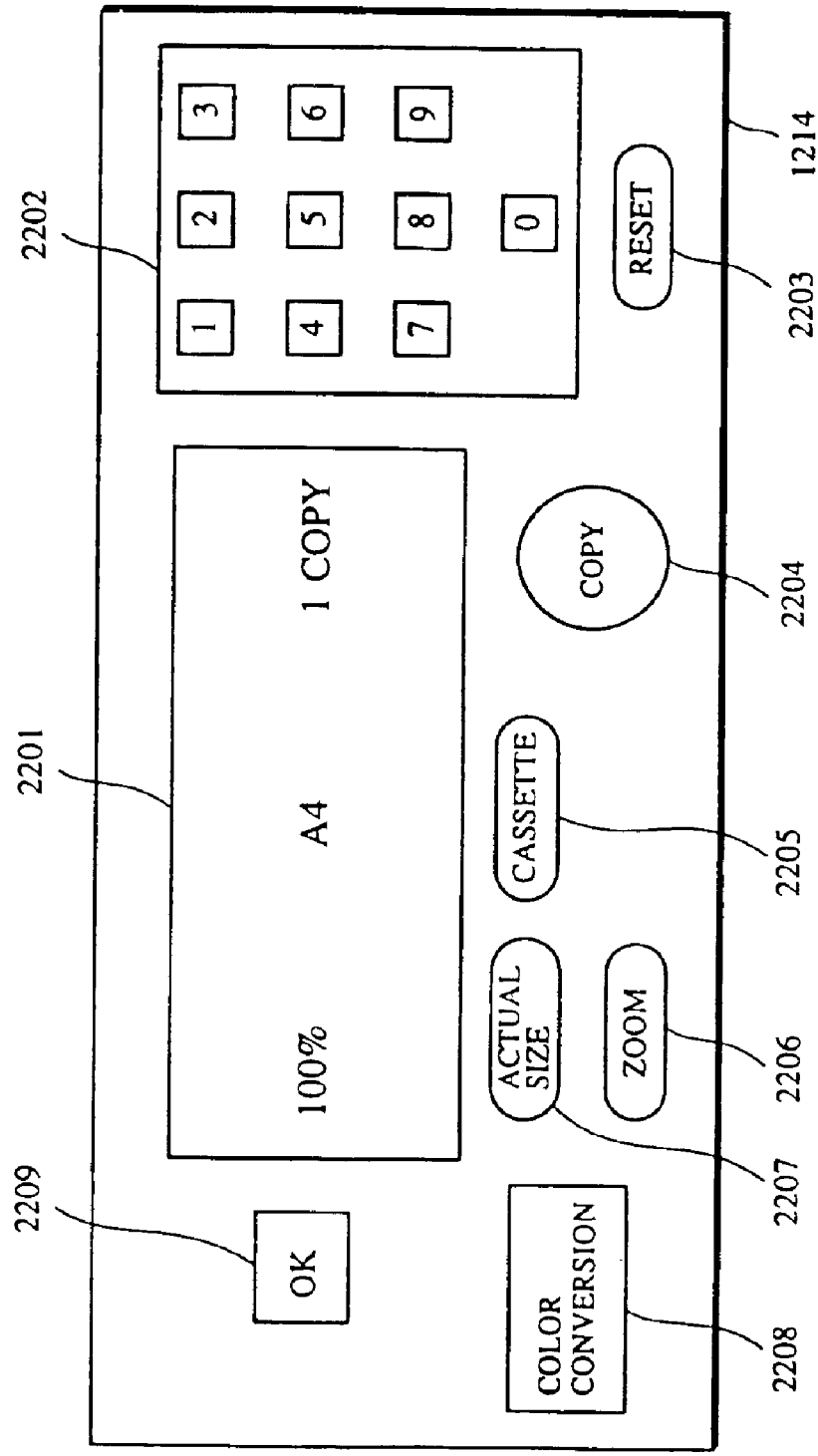
FIG. 21 is a diagram showing an operating unit 1214 in a sixth embodiment of the present invention.

The operating unit 1214 connected to the control unit 1213 is used by a user to set an operating mode of a digital full-color copying machine in accordance with the sixth embodiment. FIG. 21 illustrates the operating unit 1214 having a liquid crystal display screen 2201, a ten key cluster 2202, a reset key 2203, a copy start key 2204, a cassette selection key 2205, an actual size setting key 2207, a zoom key 2206, a color conversion key 2208, and an OK key 2209.

This embodiment has the same image processing circuit as that illustrated in FIG. 16. Smoothing circuit 1118 of this embodiment is arranged so as to be variable in smoothing effect by a signal designated by a user through the operating unit 1214.

Figure 23:
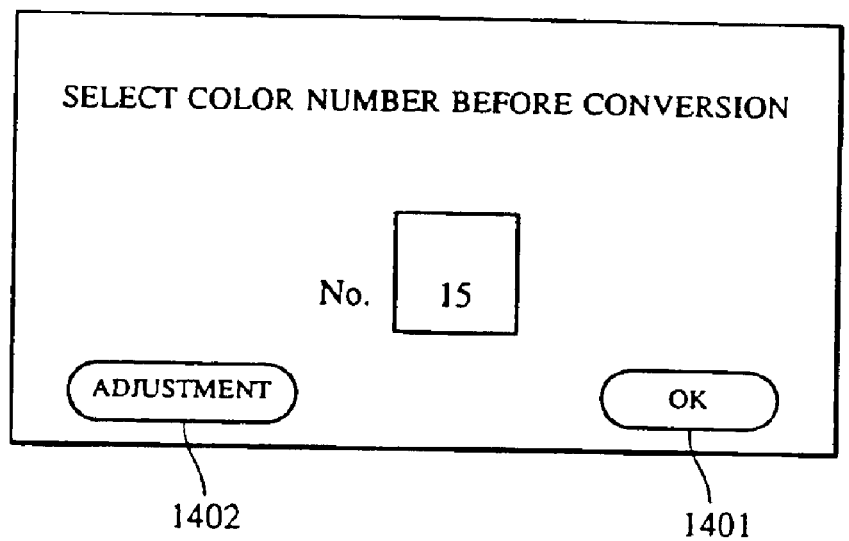
FIG. 23 is a diagram showing an operating unit at the time of color selection before conversion in the sixth embodiment.
Figure 24:
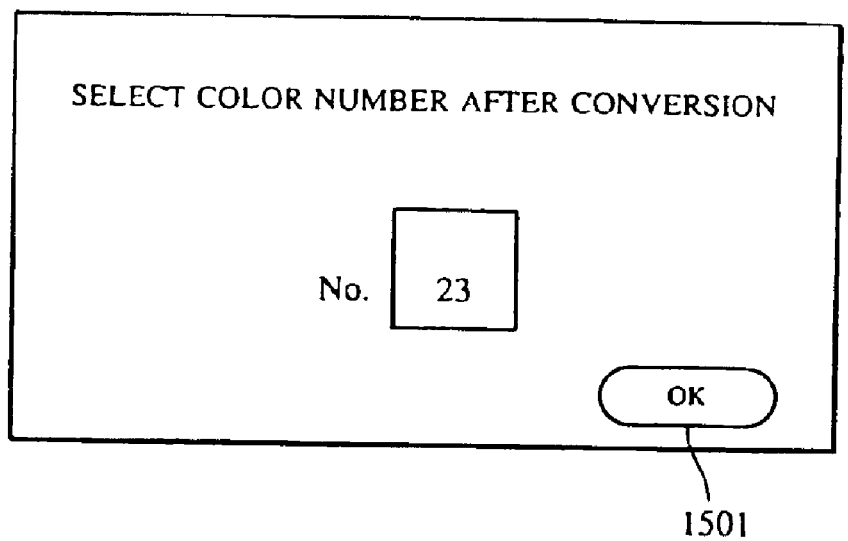
FIG. 24 is a diagram showing the operating unit at the time of color selection after conversion in the sixth embodiment.

When the color conversion key 2208 of the operating unit 1214 shown in FIG. 21 is pressed, the graphic image on the liquid crystal display is changed to an image such as illustrated in FIG. 23. A color to be converted is selected by designating a number using the ten key cluster 2202. The number is selected by referring to a color card in which colors and numbers are previously correlated. When the OK key 1401 is pressed, an image such as that shown in FIG. 24 is displayed, and a color after conversion is selected in the same manner. Colors before and after conversion are not selected exclusively from the color card. For example, a table in which colors and numbers are correlated may be previously written in a ROM (not shown). Such a table is displayed by an instruction from the operating unit 1214 to enable the user to select any one of the colors in the table.

Figure 25:
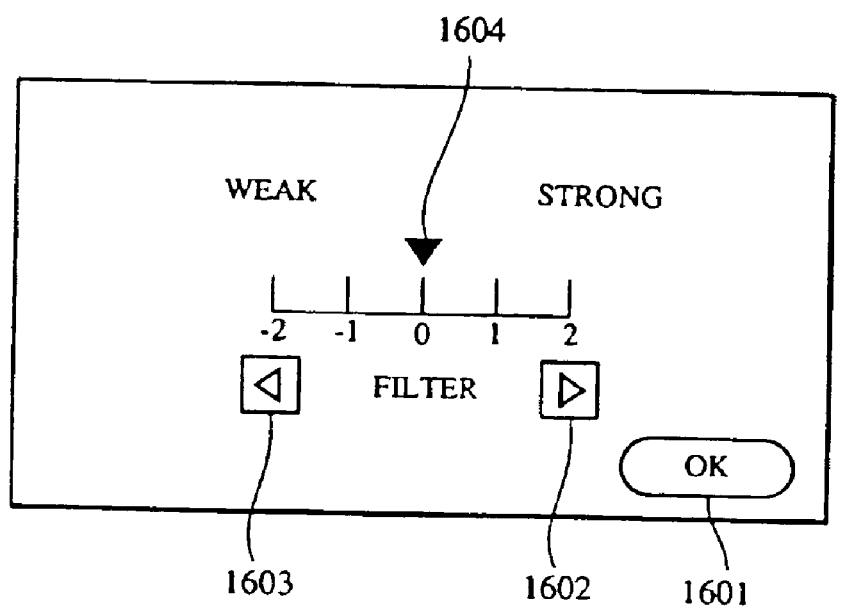
FIG. 25 is a diagram of the operating unit at the time of adjustment of the degree of smoothing in the sixth embodiment.
Figure 26:
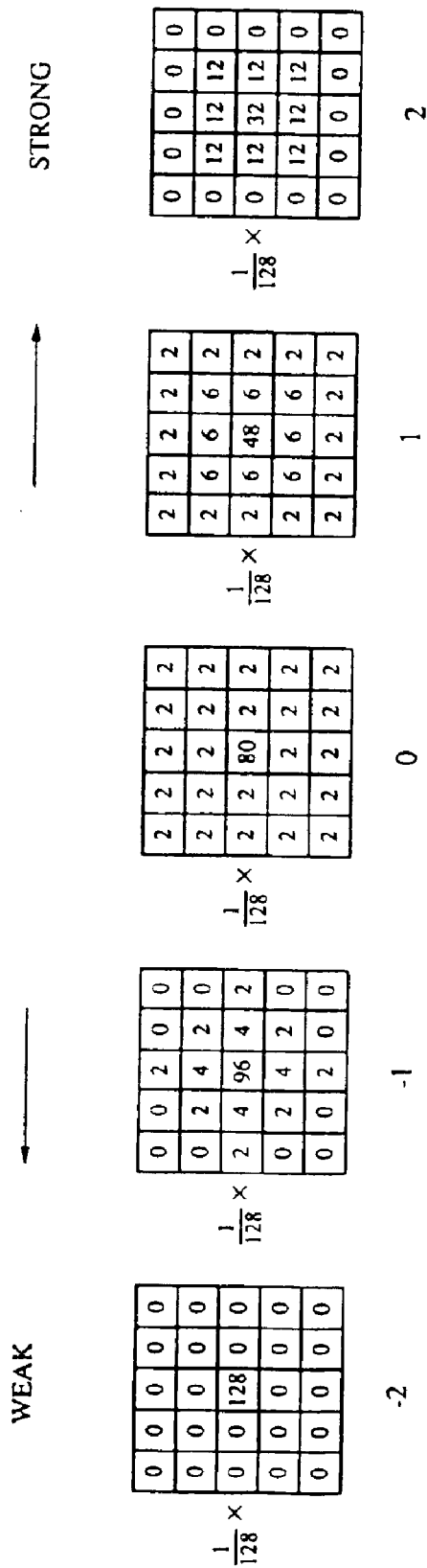
FIG. 26 is a diagram of filters in accordance with the sixth embodiment.

If an adjustment key 1402 in the graphic image shown in FIG. 23 is operated, an image such as that shown in FIG. 25 is displayed to enable the degree of smoothing to be changed. One of five filters, e.g., those shown in FIG. 26, can be selected by moving a cursor 1604 using "ADJUSTMENT KEYS" 1602 and 1603 to set the desired degree of smoothing. If the OK key 1601 is operated, the display is changed to the normal graphic image shown in FIG. 21.

If the filter is stronger, the image is smoothed more strongly. The coefficients of the filters are not limited to those shown in FIG. 26 and may be variously determined by the CPU 1301. The method of changing the filtering effect is not limited to the above-described method of changing the coefficients for weighting central and peripheral pixels. It is also possible to change the degree of smoothing of the image by changing the size of a filter. Filters having both the size and weighting coefficients varied may also be used.

The method of setting the selected filter in the smoothing circuit 1118 will be described. The filter is determined by the CPU in accordance with the designation from the operating unit 1214, and is sent to the selection circuits 1042 and the 1048 via the CPU bus shown in FIG. 22. The filter as an output from the CPU is written in the smoothing circuit 1118 when writing it in the smoothing circuit 1118 is instructed by the CPU through the CPUACC. It is possible to obtain plural kinds of image data by changing the setting of the above-described variable filter. It is therefore possible to make color conversion in accordance with an operator's preference. In the above-described example, the filter is set by a user. However, the arrangement may alternatively be such that pre-scanning is performed with line sensor 1010 shown in FIG. 8. In this case, CPU 1301 automatically determines the density of screen lines of a halftone dot image and automatically selects an optimal filter according to the result of determination. If the filter is automatically changed in this manner, the colors of the original halftone dot image can be accurately reproduced and it is therefore possible to achieve accurate color identification and color conversion. The decision signal processing circuit 1120 thickens or thins image portions having decision result non-uniformity at the boundaries between colors by majority operation or the like. In other respects, the operation and effect of this arrangement are the same as those of the arrangement shown in FIG. 16.

In a portion of the smoothing circuit 1118 where the hue signal H is processed, the hue signal H is rotated through 3600 one time. Therefore, a preprocessing circuit for calculating the actual range of the signal value is provided at this portion along with a common product/sum calculation circuit for processing the signals S and L as well as the signal H.

In this embodiment, various filters differing in weighting or size are determined automatically or by user setting to perform smoothing before color identification processing. However, it is apparent that the same effect can also be achieved by changing the window size or a constant of majority decision (in which a target pixel in an m×m window is recognized as a particular color when it is determined that a number of pixels equal to or larger than a predetermined number n among the pixels in the window has a particular color).

In this embodiment, as described above, area processing characteristics are set for area processing, and color identification is made on the basis of image data processed in accordance with the processing characteristics. It is therefore possible to perform plural kinds of color identification by changing the setting. Even if the image after color conversion made by the operator is unsatisfactory, plural kinds of conversion can be obtained by changing the above-described setting.

The area processing characteristics are controlled according to the density of halftone dot lines of a halftone dot image. It is therefore possible to accurately reproduce the color of the image as well as to accurately identify the color regardless of the density of halftone dot image lines.

As many apparently widely different embodiments of the present invention can be made without departing from the spirit and scope thereof, it is to be understood that the invention is not limited to the specific embodiments thereof except as defined in the claims.

What is claimed is:

1. A color image processing apparatus comprising:

sensing means for sensing the density of screen lines of a halftone dot image;

computing means for computing an area processing characteristic with respect to image data having plural components on the halftone dot image according to the result of said sensing means;

processing means for processing the image data having plural components according to the area processing characteristic computed by said computing means; and determination means for determining a color on the basis of the image data having plural components processed by said processing means.

2. An apparatus according to claim 1, wherein the area processing includes at least one of filtering processing and majority decision processing.

3. An apparatus according to claim 2, wherein said filtering processing is smoothing using a spatial filter.

4. An apparatus according to claim 1, wherein said determination means has equal color determination means which determines image data having the same color as a color previously designated in the processed image data having plural components.

5. A color image processing method comprising the steps of:

sensing the density of screen lines of a halftone dot image;

computing an area processing characteristic with respect to image data having plural components on the halftone dot image according to the result of said sensing step;

processing the image data having plural components according to the area processing characteristic computed in said computing step; and determining a color on the basis of the image data having plural components processed in said processing step, wherein said determining step determines image data having the same color as a color previously designated in the processed image date having plural components.

* * * * *

UNITED STATES PATENT AND TRADEMARK OFFICE
CERTIFICATE OF CORRECTION

PATENT NO. : 6,927,877 B2
DATED : August 9, 2005
INVENTOR(S) : Akiko Kanno et al.

It is certified that error appears in the above-identified patent and that said Letters Patent is hereby corrected as shown below:

Column 2,
Line 3, "$M1x\Gamma1 \leqq R \leqq M1x\gamma2$" should read -- $M1x\gamma1 \leqq R \leqq M1x\gamma2$ --.

Column 4,
Line 10, "the" should read -- of the --.

Column 5,
Line 67, "and 11" should read -- and I1 --.

Column 6,
Line 3, "and 11" should read -- and I1 --.

Column 7,
Line 58, "not be" should read -- not to be --.

Column 10,
Line 43, "(S#0), and" should read -- (S≠0), and --.
Line 45, "I1nt ( )" should read -- Int ( ) --.

Column 11
Line 64, "exist" should read -- exists --.

Column 15,
Line 18, "circuits)" should read -- circuits --.
Line 36, "11." should read -- H. --.
Line 58, "of 0º, (R)," should read -- of 0º (R), --.

UNITED STATES PATENT AND TRADEMARK OFFICE
CERTIFICATE OF CORRECTION

PATENT NO.    : 6,927,877 B2
DATED         : August 9, 2005
INVENTOR(S)   : Akiko Kanno et al.

It is certified that error appears in the above-identified patent and that said Letters Patent is hereby corrected as shown below:

<u>Column 19,</u>
Line 54, "3600" should read -- 360º --.

<u>Column 20,</u>
Line 61, "date" should read -- data --.

Signed and Sealed this

Fifteenth Day of November, 2005

JON W. DUDAS
*Director of the United States Patent and Trademark Office*